(12) United States Patent
Parikh et al.

(10) Patent No.: US 10,830,920 B2
(45) Date of Patent: Nov. 10, 2020

(54) DISTRIBUTED ANALYSIS X-RAY INSPECTION METHODS AND SYSTEMS

(71) Applicant: Rapiscan Systems, Inc., Torrance, CA (US)

(72) Inventors: Shehul Sailesh Parikh, Snoqualmie, WA (US); Balamurugan Sankaranarayanan, Kent, WA (US); Jeffrey Bryan Abel, Issaquah, WA (US); Siva Kumar, Fremont, CA (US); Joseph Bendahan, San Jose, CA (US)

(73) Assignee: Rapiscan Systems, Inc., Torrance, CA (US)

( * ) Notice: Subject to any disclaimer, the term of this patent is extended or adjusted under 35 U.S.C. 154(b) by 0 days.

(21) Appl. No.: 16/678,721

(22) Filed: Nov. 8, 2019

(65) Prior Publication Data
US 2020/0073009 A1 Mar. 5, 2020

Related U.S. Application Data

(63) Continuation of application No. 16/248,547, filed on Jan. 15, 2019, now Pat. No. 10,509,142, which is a
(Continued)

(51) Int. Cl.
*G06T 7/00* (2017.01)
*G08B 13/194* (2006.01)
(Continued)

(52) U.S. Cl.
CPC .......... *G01V 5/0083* (2013.01); *G01V 5/0016* (2013.01); *G06Q 10/0838* (2013.01);
(Continued)

(58) Field of Classification Search
CPC ................... G06T 7/0004; G06T 7/001; G06T 2207/10116; G08B 13/194; G06Q 10/0838; G01V 5/0016
See application file for complete search history.

(56) References Cited

U.S. PATENT DOCUMENTS

| 2,006 A | 3/1841 | Read |
|---|---|---|
| 2,636,619 A | 4/1953 | Alexander |

(Continued)

FOREIGN PATENT DOCUMENTS

| CA | 2574402 A1 | 1/2006 |
|---|---|---|
| CA | 2319958 C | 3/2007 |

(Continued)

OTHER PUBLICATIONS

First Examination Report for Australian Application No. 2012304490, dated Jul. 7, 2014.
(Continued)

*Primary Examiner* — Siamak Harandi
(74) *Attorney, Agent, or Firm* — Novel IP

(57) ABSTRACT

The present specification discloses systems and methods for integrating manifest data for cargo and light vehicles with their X-ray images generated during scanning. Manifest data is automatically imported into the system for each shipment, and helps the security personnel to quickly determine the contents of cargo. In case of a mismatch between cargo contents shown by manifest data and the X-ray images, the cargo may be withheld for further inspection. In one embodiment, the process of analyzing the X-ray image of the cargo in conjunction with the manifest data is automated.

30 Claims, 11 Drawing Sheets

Related U.S. Application Data continuation of application No. 15/455,436, filed on Mar. 10, 2017, now Pat. No. 10,422,919, which is a continuation of application No. 14/739,329, filed on Jun. 15, 2015, now Pat. No. 9,632,206, which is a continuation of application No. 13/606,442, filed on Sep. 7, 2012, now Pat. No. 9,111,331.

(60) Provisional application No. 61/532,093, filed on Sep. 7, 2011.

(51) Int. Cl.
   *G01V 5/00* (2006.01)
   *G06Q 10/08* (2012.01)
(52) U.S. Cl.
   CPC ............ *G06T 7/001* (2013.01); *G06T 7/0004* (2013.01); *G08B 13/194* (2013.01); *G06T 2207/10116* (2013.01); *G06T 2207/30248* (2013.01)

(56) References Cited

U.S. PATENT DOCUMENTS

| | | |
|---|---|---|
| 3,124,679 A | 3/1964 | Tittman et al. |
| 3,240,971 A | 3/1966 | Morgan |
| 3,275,831 A | 9/1966 | Martin |
| 3,374,355 A | 3/1968 | Parratt |
| 3,439,166 A | 4/1969 | Chope |
| 3,670,164 A | 6/1972 | Hardy et al. |
| 3,780,291 A | 12/1973 | Stein |
| 3,784,827 A | 1/1974 | Calhoun |
| 3,790,785 A | 2/1974 | Paolini et al. |
| 3,808,444 A | 4/1974 | Schneeberger et al. |
| 3,832,545 A | 8/1974 | Bartko |
| 3,835,324 A | 9/1974 | Weigle |
| 3,837,502 A | 9/1974 | Hornagold |
| 3,872,287 A | 3/1975 | Koeman |
| 3,904,923 A | 9/1975 | Schwartz |
| 3,980,889 A | 9/1976 | Haas |
| 3,997,787 A | 12/1976 | Fearon et al. |
| 4,020,346 A | 4/1977 | Dennis |
| 4,047,036 A | 9/1977 | Smith |
| 4,064,440 A | 12/1977 | Roder |
| 4,158,773 A | 6/1979 | Novak |
| 4,164,138 A | 8/1979 | Burkhart |
| 4,173,010 A | 10/1979 | Hoffmann |
| 4,217,641 A | 8/1980 | Naparstek |
| 4,229,654 A | 10/1980 | Arya |
| 4,239,969 A | 12/1980 | Galetta |
| 4,247,774 A | 1/1981 | Brooks |
| 4,251,726 A | 2/1981 | Alvarez |
| 4,255,659 A | 3/1981 | Kaufman |
| 4,338,626 A | 7/1982 | Lemelson |
| 4,366,382 A | 12/1982 | Kotowski |
| 4,379,348 A | 4/1983 | Haas |
| 4,379,481 A | 4/1983 | Juner |
| 4,383,327 A | 5/1983 | Kruger |
| 4,418,575 A | 12/1983 | Hundt |
| 4,430,568 A | 2/1984 | Yoshida |
| 4,470,303 A | 9/1984 | ODonnell |
| 4,480,899 A | 11/1984 | Sprague |
| 4,482,958 A | 11/1984 | Nakayama |
| 4,509,075 A | 4/1985 | Simms |
| 4,535,246 A | 8/1985 | Shani |
| 4,539,648 A | 9/1985 | Schatzki |
| 4,558,220 A | 12/1985 | Evans |
| 4,566,113 A | 1/1986 | Doenges |
| 4,573,198 A | 2/1986 | Anderson |
| 4,580,219 A | 4/1986 | Pelc |
| 4,590,558 A | 5/1986 | Glover |
| 4,598,202 A | 7/1986 | Koechner |
| 4,599,740 A | 7/1986 | Cable |
| 4,612,666 A | 9/1986 | King |
| 4,637,056 A | 1/1987 | Sherman |
| 4,651,297 A | 3/1987 | Schlunt |
| 4,653,109 A | 3/1987 | Lemelson |
| 4,658,408 A | 4/1987 | Amor |
| 4,697,594 A | 10/1987 | Mayo, Jr. |
| 4,709,333 A | 11/1987 | Crawford |
| 4,722,096 A | 1/1988 | Dietrich |
| 4,724,543 A | 2/1988 | Klevecz |
| 4,725,733 A | 2/1988 | Horman et al. |
| 4,736,399 A | 4/1988 | Okazaki |
| 4,736,401 A | 4/1988 | Donges |
| 4,737,650 A | 4/1988 | West |
| 4,755,680 A | 7/1988 | Logan |
| 4,756,015 A | 7/1988 | Doenges |
| 4,759,047 A | 7/1988 | Donges |
| 4,775,895 A | 10/1988 | Traupe |
| 4,783,794 A | 11/1988 | Dietrich |
| 4,788,704 A | 11/1988 | Donges |
| 4,793,261 A | 12/1988 | Schwaemmle |
| 4,795,253 A | 1/1989 | Sandridge |
| 4,817,123 A | 3/1989 | Sones |
| 4,819,188 A | 4/1989 | Matsubara |
| 4,832,447 A | 5/1989 | Javidi |
| 4,837,733 A | 6/1989 | Shiraishi |
| 4,838,644 A | 6/1989 | Ochoa |
| 4,841,554 A | 6/1989 | Doenges |
| 4,849,912 A | 7/1989 | Leberl |
| 4,862,358 A | 8/1989 | Kimura |
| 4,869,574 A | 9/1989 | Hartman |
| 4,870,670 A | 9/1989 | Geus |
| 4,873,708 A | 10/1989 | Cusano |
| 4,884,289 A | 11/1989 | Glockmann |
| 4,887,899 A | 12/1989 | Hung |
| 4,893,015 A | 1/1990 | Kubierschky |
| 4,916,722 A | 4/1990 | Ema |
| 4,933,961 A | 6/1990 | Rushbrooke |
| 4,941,162 A | 7/1990 | Vartsky |
| 4,955,060 A | 9/1990 | Katsuki et al. |
| 4,957,250 A | 9/1990 | Hararat-Tehrani |
| 4,973,846 A | 11/1990 | Lanza |
| 4,989,229 A | 1/1991 | Negrelli |
| 5,003,616 A | 3/1991 | Orita |
| 5,012,917 A | 5/1991 | Gilbert |
| 5,014,293 A | 5/1991 | Boyd |
| 5,018,178 A | 5/1991 | Katsumata |
| 5,020,111 A | 5/1991 | Weber |
| 5,022,062 A | 6/1991 | Annis |
| 5,034,812 A | 7/1991 | Rawlings |
| 5,041,728 A | 8/1991 | Spacher |
| 5,041,993 A | 8/1991 | Rawlings |
| 5,056,130 A | 10/1991 | Engel |
| 5,060,249 A | 10/1991 | Eisen |
| 5,063,602 A | 11/1991 | Peppers |
| 5,065,418 A | 11/1991 | Bermbach |
| 5,070,519 A | 12/1991 | Stein |
| 5,073,782 A | 12/1991 | Huguenin |
| 5,079,698 A | 1/1992 | Grenier |
| 5,091,924 A | 2/1992 | Bermbach |
| 5,098,640 A | 3/1992 | Gozani |
| 5,107,351 A | 4/1992 | Leib |
| 5,109,276 A | 4/1992 | Nudelman |
| 5,109,691 A | 5/1992 | Corrigan |
| 5,125,015 A | 6/1992 | Shimoni |
| 5,132,811 A | 7/1992 | Iwaki |
| 5,132,842 A | 7/1992 | Yeh |
| 5,132,998 A | 7/1992 | Tsutsui |
| 5,138,167 A | 8/1992 | Barnes |
| 5,150,229 A | 9/1992 | Takesue |
| 5,151,588 A | 9/1992 | Kiri |
| 5,162,652 A | 11/1992 | Cohen |
| 5,175,756 A | 12/1992 | Pongratz |
| 5,179,581 A | 1/1993 | Annis |
| 5,181,234 A | 1/1993 | Smith |
| 5,182,764 A | 1/1993 | Peschmann |
| 5,185,778 A | 2/1993 | Magram |
| 5,195,629 A | 3/1993 | Gottstein |
| 5,197,088 A | 3/1993 | Vincent |
| 5,198,669 A | 3/1993 | Namiki |
| 5,200,626 A | 4/1993 | Schultz |
| 5,202,932 A | 4/1993 | Cambier |

(56) References Cited

U.S. PATENT DOCUMENTS

| | | |
|---|---|---|
| 5,216,541 A | 6/1993 | Takesue |
| 5,237,598 A | 8/1993 | Albert |
| 5,239,595 A | 8/1993 | Takemura |
| 5,243,664 A | 9/1993 | Tuy |
| 5,247,561 A | 9/1993 | Kotowski |
| 5,257,085 A | 10/1993 | Ulich |
| 5,257,322 A | 10/1993 | Matsuoka |
| 5,259,012 A | 11/1993 | Baker |
| 5,268,967 A | 12/1993 | Jang |
| 5,283,641 A | 2/1994 | Lemelson |
| 5,297,222 A | 3/1994 | Mori |
| 5,298,756 A | 3/1994 | McCollum |
| 5,299,116 A | 3/1994 | Owens |
| 5,308,986 A | 5/1994 | Walker |
| 5,309,244 A | 5/1994 | Katagiri et al. |
| 5,309,523 A | 5/1994 | Iwaki |
| 5,311,359 A | 5/1994 | Lucas |
| 5,319,544 A | 6/1994 | Schmerer |
| 5,319,547 A | 6/1994 | Krug |
| 5,323,004 A | 6/1994 | Ettinger |
| 5,323,472 A | 6/1994 | Falk |
| 5,327,286 A | 7/1994 | Sampsell |
| 5,339,350 A | 8/1994 | Thelosen |
| 5,345,081 A | 9/1994 | Rogers |
| 5,345,173 A | 9/1994 | Bito |
| 5,363,940 A | 11/1994 | Fahrion |
| 5,365,560 A | 11/1994 | Tam |
| 5,365,564 A | 11/1994 | Yashida |
| 5,367,552 A | 11/1994 | Peschmann |
| 5,371,542 A | 12/1994 | Pauli |
| 5,375,156 A | 12/1994 | Kuo-Petravic |
| 5,376,796 A | 12/1994 | Chan |
| 5,379,334 A | 1/1995 | Zimmer |
| 5,379,336 A | 1/1995 | Kramer |
| 5,388,684 A | 2/1995 | Peck |
| 5,418,380 A | 5/1995 | Simon |
| 5,420,788 A | 5/1995 | Vissers |
| 5,425,113 A | 6/1995 | Ito |
| 5,428,657 A | 6/1995 | Papanicolopoulos |
| 5,430,787 A | 7/1995 | Norton |
| 5,434,415 A | 7/1995 | Terada |
| 5,464,013 A | 11/1995 | Lemelson |
| 5,465,284 A | 11/1995 | Karellas |
| 5,481,584 A | 1/1996 | Tang |
| 5,481,622 A | 1/1996 | Gerhardt |
| 5,483,569 A | 1/1996 | Annis |
| 5,485,312 A | 1/1996 | Horner |
| 5,490,193 A | 2/1996 | Kuroda |
| 5,490,218 A | 2/1996 | Krug |
| 5,493,444 A | 2/1996 | Khoury |
| 5,493,517 A | 2/1996 | Frazier |
| 5,493,596 A | 2/1996 | Annis |
| 5,503,424 A | 4/1996 | Agopian |
| 5,506,880 A | 4/1996 | Scardino |
| 5,519,225 A | 5/1996 | Mohr |
| 5,524,133 A | 6/1996 | Neale |
| 5,528,702 A | 6/1996 | Mitsuoka |
| 5,528,703 A | 6/1996 | Lee |
| 5,541,856 A | 7/1996 | Hammermeister |
| 5,546,189 A | 8/1996 | Svetkoff |
| 5,568,256 A | 10/1996 | Korner |
| 5,580,471 A | 12/1996 | Fukumoto |
| 5,589,162 A | 12/1996 | Muraoka |
| 5,591,967 A | 1/1997 | Moake |
| 5,592,561 A | 1/1997 | Moore |
| 5,595,767 A | 1/1997 | Cinquin |
| 5,600,303 A | 2/1997 | Husseiny |
| 5,600,485 A | 2/1997 | Iwaki |
| 5,600,700 A | 2/1997 | Krug |
| 5,604,634 A | 2/1997 | Khoury |
| 5,606,167 A | 2/1997 | Miller |
| 5,619,596 A | 4/1997 | Iwaki |
| 5,625,192 A | 4/1997 | Oda |
| 5,625,717 A | 4/1997 | Hashimoto |
| 5,629,669 A | 5/1997 | Asano |
| 5,638,420 A | 6/1997 | Armistead |
| 5,642,393 A | 6/1997 | Krug |
| 5,642,394 A | 6/1997 | Rothschild |
| 5,647,018 A | 7/1997 | Benjamin |
| 5,664,574 A | 9/1997 | Chance |
| 5,668,846 A | 9/1997 | Fox |
| 5,679,956 A | 10/1997 | Johnston |
| 5,680,525 A | 10/1997 | Sakai |
| 5,684,565 A | 11/1997 | Oshida |
| 5,692,028 A | 11/1997 | Geus |
| 5,692,029 A | 11/1997 | Husseiny |
| 5,692,446 A | 12/1997 | Becker |
| 5,698,854 A | 12/1997 | Gupta |
| 5,699,400 A | 12/1997 | Lee |
| 5,703,921 A | 12/1997 | Fujita |
| 5,706,816 A | 1/1998 | Mochizuki |
| 5,726,449 A | 3/1998 | Yoshiike |
| 5,739,539 A | 4/1998 | Wang |
| 5,740,221 A | 4/1998 | Norman |
| 5,745,542 A | 4/1998 | Gordon |
| 5,748,305 A | 5/1998 | Shimono |
| 5,748,697 A | 5/1998 | Tam |
| 5,754,617 A | 5/1998 | Itoh |
| 5,754,621 A | 5/1998 | Suzuki |
| 5,756,875 A | 5/1998 | Parker |
| 5,757,981 A | 5/1998 | Kawakubo |
| 5,761,334 A | 6/1998 | Nakajima |
| 5,764,683 A | 6/1998 | Swift |
| 5,764,719 A | 6/1998 | Noettling |
| 5,768,334 A | 6/1998 | Maitrejean |
| 5,777,742 A | 7/1998 | Marron |
| 5,778,046 A | 7/1998 | Molloi |
| 5,779,641 A | 7/1998 | Hatfield |
| 5,784,429 A | 7/1998 | Arai |
| 5,786,597 A | 7/1998 | Lingren |
| 5,787,145 A | 7/1998 | Geus |
| 5,794,788 A | 8/1998 | Massen |
| 5,796,802 A | 8/1998 | Gordon |
| 5,796,868 A | 8/1998 | Dutta-Choudhury |
| 5,799,100 A | 8/1998 | Clarke |
| 5,800,355 A | 9/1998 | Hasegawa |
| 5,802,133 A | 9/1998 | Kawai |
| 5,805,660 A | 9/1998 | Perion |
| 5,809,171 A | 9/1998 | Neff |
| 5,815,198 A | 9/1998 | Vachtsevanos |
| 5,815,264 A | 9/1998 | Reed |
| 5,828,722 A | 10/1998 | Ploetz |
| 5,828,774 A | 10/1998 | Wang |
| 5,834,153 A | 11/1998 | Hasegawa |
| 5,835,558 A | 11/1998 | Maschke |
| 5,835,561 A | 11/1998 | Moorman |
| 5,838,758 A | 11/1998 | Krug |
| 5,838,759 A | 11/1998 | Armistead |
| 5,841,828 A | 11/1998 | Gordon |
| 5,841,907 A | 11/1998 | Javidi |
| 5,842,578 A | 12/1998 | Cordeiro |
| 5,850,465 A | 12/1998 | Shimura |
| 5,862,198 A | 1/1999 | Samarasekera |
| 5,862,258 A | 1/1999 | Taylor |
| 5,864,598 A | 1/1999 | Hsieh |
| 5,866,907 A | 2/1999 | Drukier |
| 5,870,449 A | 2/1999 | Lee |
| 5,877,849 A | 3/1999 | Ramer |
| 5,881,123 A | 3/1999 | Tam |
| 5,893,095 A | 4/1999 | Jain |
| 5,894,345 A | 4/1999 | Takamoto |
| 5,895,073 A | 4/1999 | Moore |
| 5,901,196 A | 5/1999 | Sauer |
| 5,901,198 A | 5/1999 | Crawford |
| 5,903,623 A | 5/1999 | Swift |
| 5,909,285 A | 6/1999 | Beaty |
| 5,909,477 A | 6/1999 | Crawford |
| 5,909,478 A | 6/1999 | Polichar |
| 5,910,765 A | 6/1999 | Slemon |
| 5,910,973 A | 6/1999 | Grodzins |
| 5,911,139 A | 6/1999 | Jain |
| 5,917,190 A | 6/1999 | Yodh |
| 5,926,568 A | 7/1999 | Chaney |
| 5,933,471 A | 8/1999 | Kalvin |

(56) References Cited

U.S. PATENT DOCUMENTS

| | | |
|---|---|---|
| 5,936,249 A | 8/1999 | Eisen |
| 5,940,468 A | 8/1999 | Huang |
| 5,943,388 A | 8/1999 | Tuemer |
| 5,951,474 A | 9/1999 | Matsunaga |
| 5,953,452 A | 9/1999 | Boone |
| 5,958,336 A | 9/1999 | Duarte |
| 5,960,104 A | 9/1999 | Conners |
| 5,974,111 A | 10/1999 | Krug |
| 5,978,440 A | 11/1999 | Kang |
| 5,981,949 A | 11/1999 | Leahy |
| 5,987,095 A | 11/1999 | Chapman |
| 5,994,706 A | 11/1999 | Allen |
| 6,005,916 A | 12/1999 | Johnson |
| 6,008,496 A | 12/1999 | Winefordner |
| 6,009,142 A | 12/1999 | Sauer |
| 6,011,266 A | 1/2000 | Bell |
| 6,011,620 A | 1/2000 | Sites |
| 6,014,628 A | 1/2000 | Kovarik, Jr. |
| 6,018,561 A | 1/2000 | Tam |
| 6,018,562 A | 1/2000 | Willson |
| 6,031,890 A | 2/2000 | Bermbach |
| 6,035,014 A | 3/2000 | Hiraoglu |
| 6,043,870 A | 3/2000 | Chen |
| 6,049,381 A | 4/2000 | Reintjes |
| 6,056,671 A | 5/2000 | Marmer |
| 6,057,761 A | 5/2000 | Yukl |
| 6,057,909 A | 5/2000 | Yahav |
| 6,058,158 A | 5/2000 | Eiler |
| 6,058,159 A | 5/2000 | Conway |
| 6,060,677 A | 5/2000 | Ulrichsen |
| 6,070,583 A | 6/2000 | Perelman |
| 6,075,591 A | 6/2000 | Vokhmin |
| 6,075,880 A | 6/2000 | Kollhof |
| 6,076,400 A | 6/2000 | Bechwati |
| 6,078,638 A | 6/2000 | Sauer |
| 6,080,994 A | 6/2000 | Carrott |
| 6,081,580 A | 6/2000 | Grodzins |
| 6,084,939 A | 7/2000 | Tamura |
| 6,088,423 A | 7/2000 | Krug |
| 6,094,472 A | 7/2000 | Smith |
| 6,097,427 A | 8/2000 | Dey |
| 6,097,483 A | 8/2000 | Komatsu |
| 6,118,850 A | 9/2000 | Mayo |
| 6,149,300 A | 11/2000 | Greenway |
| 6,151,381 A | 11/2000 | Grodzins |
| 6,153,873 A | 11/2000 | Wolf |
| 6,155,179 A | 12/2000 | Aust |
| 6,157,730 A | 12/2000 | Roever |
| 6,163,403 A | 12/2000 | Carrott |
| 6,163,591 A | 12/2000 | Benjamin |
| 6,175,417 B1 | 1/2001 | Do |
| 6,175,613 B1 | 1/2001 | Boutenko |
| 6,188,747 B1 | 2/2001 | Geus |
| 6,195,413 B1 | 2/2001 | Geus |
| 6,195,444 B1 | 2/2001 | Simanovsky |
| 6,198,795 B1 | 3/2001 | Naumann |
| 6,205,195 B1 | 3/2001 | Lanza |
| 6,205,243 B1 | 3/2001 | Migdal |
| 6,216,540 B1 | 4/2001 | Nelson |
| 6,218,943 B1 | 4/2001 | Ellenbogen |
| 6,220,099 B1 | 4/2001 | Marti |
| 6,222,902 B1 | 4/2001 | Lin |
| 6,229,872 B1 | 5/2001 | Amos |
| 6,233,303 B1 | 5/2001 | Tam |
| 6,236,704 B1 | 5/2001 | Navab |
| 6,236,708 B1 | 5/2001 | Lin |
| 6,246,778 B1 | 6/2001 | Moore |
| 6,249,341 B1 | 6/2001 | Basiji |
| 6,249,567 B1 | 6/2001 | Rothschild |
| 6,252,929 B1 | 6/2001 | Swift |
| 6,255,654 B1 | 7/2001 | Verbinski |
| 6,256,370 B1 | 7/2001 | Yavuz |
| 6,256,404 B1 | 7/2001 | Gordon |
| 6,263,044 B1 | 7/2001 | Joosten |
| 6,263,231 B1 | 7/2001 | Reitter |
| 6,266,393 B1 | 7/2001 | Ein-Gal |
| 6,271,510 B1 | 8/2001 | Boxen |
| 6,272,204 B1 | 8/2001 | Amtower |
| 6,272,230 B1 | 8/2001 | Hiraoglu |
| 6,272,233 B1 | 8/2001 | Takeo |
| 6,278,760 B1 | 8/2001 | Ogawa |
| 6,282,258 B1 | 8/2001 | Stein |
| 6,285,030 B1 | 9/2001 | Williams |
| 6,288,974 B1 | 9/2001 | Nelson |
| 6,289,235 B1 | 9/2001 | Webber |
| 6,292,260 B1 | 9/2001 | Lin |
| 6,292,530 B1 | 9/2001 | Yavus |
| 6,292,533 B1 | 9/2001 | Swift |
| 6,301,327 B1 | 10/2001 | Martens |
| 6,317,509 B1 | 11/2001 | Simanovsky |
| 6,324,243 B1 | 11/2001 | Edic |
| 6,324,245 B1 | 11/2001 | Tam |
| 6,345,113 B1 | 2/2002 | Crawford |
| 6,347,132 B1 | 2/2002 | Annis |
| 6,353,673 B1 | 3/2002 | Shnitser |
| 6,366,638 B1 | 4/2002 | Hsieh |
| 6,370,222 B1 | 4/2002 | Cornick |
| 6,373,916 B1 | 4/2002 | Inoue |
| 6,373,970 B1 | 4/2002 | Dong |
| 6,373,979 B1 | 4/2002 | Wang |
| 6,380,540 B1 | 4/2002 | Maor |
| 6,381,297 B1 | 4/2002 | Hsieh |
| 6,388,788 B1 | 5/2002 | Harris |
| 6,403,960 B1 | 6/2002 | Wellnitz |
| 6,404,841 B1 | 6/2002 | Pforr |
| 6,407,390 B1 | 6/2002 | Rozsa |
| 6,408,042 B1 | 6/2002 | Hsieh |
| 6,415,012 B1 | 7/2002 | Taguchi |
| 6,418,184 B1 | 7/2002 | Wang |
| 6,418,189 B1 | 7/2002 | Schafer |
| 6,418,194 B1 | 7/2002 | McPherson |
| 6,424,692 B1 | 7/2002 | Suzuki |
| 6,430,255 B2 | 8/2002 | Fenkart |
| 6,438,577 B1 | 8/2002 | Owens |
| 6,442,288 B1 | 8/2002 | Haerer |
| 6,445,765 B1 | 9/2002 | Frank |
| 6,448,545 B1 | 9/2002 | Chen |
| 6,453,003 B1 | 9/2002 | Springer |
| 6,459,755 B1 | 10/2002 | Li |
| 6,459,761 B1 | 10/2002 | Grodzins |
| 6,459,764 B1 | 10/2002 | Chalmers |
| 6,463,181 B2 | 10/2002 | Duarte |
| 6,473,489 B2 | 10/2002 | Bani-Hashemi |
| 6,477,221 B1 | 11/2002 | Ning |
| 6,479,826 B1 | 11/2002 | Klann |
| 6,480,285 B1 | 11/2002 | Hill |
| 6,480,564 B1 | 11/2002 | Kim |
| 6,483,894 B2 | 11/2002 | Hartick |
| 6,487,307 B1 | 11/2002 | Hennessey |
| 6,502,984 B2 | 1/2003 | Ogura |
| 6,507,025 B1 | 1/2003 | Verbinski |
| 6,507,278 B1 | 1/2003 | Brunetti |
| 6,515,285 B1 | 2/2003 | Marshall |
| 6,525,331 B1 | 2/2003 | Ngoi |
| 6,526,120 B1 | 2/2003 | Gray |
| 6,532,276 B1 | 3/2003 | Hartick |
| 6,542,574 B2 | 4/2003 | Grodzins |
| 6,542,578 B2 | 4/2003 | Ries |
| 6,542,579 B1 | 4/2003 | Takasawa |
| 6,542,580 B1 | 4/2003 | Carver |
| 6,542,628 B1 | 4/2003 | Muller |
| 6,545,281 B1 | 4/2003 | McGregor |
| 6,549,683 B1 | 4/2003 | Bergeron |
| 6,552,346 B2 | 4/2003 | Verbinski |
| 6,552,809 B1 | 4/2003 | Bergeron |
| 6,559,769 B2 | 5/2003 | Anthony |
| 6,570,177 B1 | 5/2003 | Struckhoff |
| 6,570,708 B1 | 5/2003 | Bergeron |
| 6,570,951 B1 | 5/2003 | Hsieh |
| 6,570,956 B1 | 5/2003 | Rhee |
| 6,574,296 B2 | 6/2003 | Stierstorfer |
| 6,574,297 B2 | 6/2003 | Tam |
| 6,580,777 B1 | 6/2003 | Ueki |
| 6,580,778 B2 | 6/2003 | Meder |

(56) References Cited

U.S. PATENT DOCUMENTS

| | | |
|---|---|---|
| 6,583,895 B1 | 6/2003 | Kuwahara |
| 6,584,170 B2 | 6/2003 | Aust |
| 6,586,193 B2 | 7/2003 | Yguerabide |
| 6,587,575 B1 | 7/2003 | Windham |
| 6,587,595 B1 | 7/2003 | Henkel |
| 6,597,760 B2 | 7/2003 | Beneke |
| 6,603,536 B1 | 8/2003 | Hasson |
| 6,608,921 B1 | 8/2003 | Inoue |
| 6,611,575 B1 | 8/2003 | Alyassin |
| 6,614,872 B2 | 9/2003 | Bueno |
| 6,618,466 B1 | 9/2003 | Ning |
| 6,621,887 B2 | 9/2003 | Albagli |
| 6,621,888 B2 | 9/2003 | Grodzins |
| 6,621,925 B1 | 9/2003 | Ohmori |
| 6,628,745 B1 | 9/2003 | Annis |
| 6,628,982 B1 | 9/2003 | Thomas |
| 6,628,983 B1 | 9/2003 | Gagnon |
| 6,636,581 B2 | 10/2003 | Sorenson |
| 6,637,266 B1 | 10/2003 | Froom |
| 6,644,853 B1 | 11/2003 | Kantor |
| 6,654,443 B1 | 11/2003 | Hoffman |
| 6,661,867 B2 | 12/2003 | Mario |
| 6,663,280 B2 | 12/2003 | Doenges |
| 6,665,373 B1 | 12/2003 | Kotowski |
| 6,671,508 B1 | 12/2003 | Mitsuoka |
| 6,702,459 B2 | 3/2004 | Barnes |
| 6,707,879 B2 | 3/2004 | McClelland |
| 6,713,773 B1 | 3/2004 | Lyons |
| 6,714,623 B2 | 3/2004 | Sako |
| 6,721,387 B1 | 4/2004 | Naidu |
| 6,721,391 B2 | 4/2004 | McClelland |
| 6,724,922 B1 | 4/2004 | Vilsmeier |
| 6,727,506 B2 | 4/2004 | Mallette |
| 6,731,819 B1 | 5/2004 | Fukushima |
| 6,735,274 B1 | 5/2004 | Zahavi |
| 6,735,279 B1 | 5/2004 | Jacobs |
| 6,738,450 B1 | 5/2004 | Barford |
| 6,744,909 B1 | 6/2004 | Kostrzewski |
| 6,746,864 B1 | 6/2004 | McNeil |
| 6,751,349 B2 | 6/2004 | Matama |
| 6,754,374 B1 | 6/2004 | Miller |
| 6,763,148 B1 | 7/2004 | Sternberg |
| 6,768,421 B1 | 7/2004 | Alioto |
| 6,785,357 B2 | 8/2004 | Bernardi |
| 6,785,410 B2 | 8/2004 | Vining |
| 6,791,089 B1 | 9/2004 | Caffrey |
| H2110 H | 10/2004 | Newman |
| 6,801,647 B1 | 10/2004 | Arakawa |
| 6,803,997 B2 | 10/2004 | Stanek |
| 6,804,412 B1 | 10/2004 | Wilkinson |
| 6,807,458 B2 | 10/2004 | Quackenbush |
| 6,813,395 B1 | 11/2004 | Kinjo |
| 6,825,854 B1 | 11/2004 | Beneke |
| 6,829,585 B1 | 12/2004 | Grewal |
| 6,837,422 B1 | 1/2005 | Meder |
| 6,839,403 B1 | 1/2005 | Kotowski |
| 6,839,406 B2 | 1/2005 | Ries |
| 6,843,599 B2 | 1/2005 | Le |
| 6,845,873 B1 | 1/2005 | Chattey |
| 6,856,272 B2 | 2/2005 | Levitan |
| 6,865,287 B1 | 3/2005 | Beneke |
| 6,865,509 B1 | 3/2005 | Hsiung |
| 6,868,138 B2 | 3/2005 | Clinthorne |
| 6,873,261 B2 | 3/2005 | Anthony |
| 6,876,322 B2 | 4/2005 | Keller |
| 6,891,470 B2 | 5/2005 | Bohinc, Jr. |
| 6,895,072 B2 | 5/2005 | Schrock |
| 6,895,338 B2 | 5/2005 | Hsiung |
| 6,899,540 B1 | 5/2005 | Neiderman |
| 6,918,541 B2 | 7/2005 | Knowles |
| 6,920,197 B2 | 7/2005 | Kang |
| 6,922,461 B2 | 7/2005 | Kang |
| 6,924,487 B2 | 8/2005 | Bolozdynya |
| 6,928,141 B2 | 8/2005 | Carver |
| 6,936,828 B2 | 8/2005 | Saccomanno |
| 6,937,692 B2 | 8/2005 | Johnson |
| 6,938,488 B2 | 9/2005 | Diaz |
| 6,940,943 B2 | 9/2005 | Claus |
| 6,950,492 B2 | 9/2005 | Besson |
| 6,952,163 B2 | 10/2005 | Huey |
| 6,970,531 B2 | 11/2005 | Eberhard |
| 6,972,693 B2 | 12/2005 | Brown |
| 6,980,681 B1 | 12/2005 | Hsieh |
| 6,982,643 B2 | 1/2006 | Garfinkle |
| 6,990,171 B2 | 1/2006 | Toth |
| 6,998,617 B2 | 2/2006 | DEmilio |
| 7,000,827 B2 | 2/2006 | Meder |
| 7,005,982 B1 | 2/2006 | Frank |
| 7,012,256 B1 | 3/2006 | Roos |
| 7,020,241 B2 | 3/2006 | Beneke |
| 7,026,944 B2 | 4/2006 | Alioto |
| 7,030,755 B2 | 4/2006 | Bohinc, Jr. |
| 7,043,474 B2 | 5/2006 | Mojsilovic |
| 7,045,787 B1 | 5/2006 | Verbinski |
| 7,046,761 B2 | 5/2006 | Ellenbogen |
| 7,046,768 B2 | 5/2006 | Gilevich |
| 7,050,616 B2 | 5/2006 | Hsieh |
| 7,062,074 B1 | 6/2006 | Beneke |
| 7,064,336 B2 | 6/2006 | Archer |
| 7,065,175 B2 | 6/2006 | Green |
| 7,068,751 B2 | 6/2006 | Toth |
| 7,072,434 B1 | 7/2006 | Tybinkowski |
| 7,092,485 B2 | 8/2006 | Kravis |
| 7,098,461 B2 | 8/2006 | Endo |
| 7,099,004 B2 | 8/2006 | Masten |
| 7,099,432 B2 | 8/2006 | Ichihara |
| 7,100,165 B2 | 8/2006 | Eldridge |
| 7,103,137 B2 | 9/2006 | Seppi |
| 7,105,828 B2 | 9/2006 | Unger |
| 7,115,875 B1 | 10/2006 | Worstell |
| 7,116,235 B2 | 10/2006 | Alioto |
| 7,116,749 B2 | 10/2006 | Besson |
| 7,130,456 B2 | 10/2006 | Hillmann |
| 7,136,716 B2 | 11/2006 | Hsiung |
| 7,139,406 B2 | 11/2006 | McClelland |
| 7,142,109 B1 | 11/2006 | Frank |
| 7,142,633 B2 | 11/2006 | Eberhard |
| 7,151,447 B1 | 12/2006 | Willms |
| 7,154,650 B2 | 12/2006 | Lettington |
| 7,164,138 B2 | 1/2007 | McGregor |
| 7,164,750 B2 | 1/2007 | Nabors |
| 7,183,554 B2 | 2/2007 | Gallagher |
| 7,183,906 B2 | 2/2007 | Zanovitch |
| 7,193,515 B1 | 3/2007 | Roberts |
| 7,203,276 B2 | 4/2007 | Arsenault |
| 7,204,125 B2 | 4/2007 | Fine |
| 7,207,713 B2 | 4/2007 | Lowman |
| 7,212,113 B2 | 5/2007 | Zanovitch |
| 7,212,661 B2 | 5/2007 | Samara |
| 7,215,738 B2 | 5/2007 | Muenchau |
| 7,233,644 B1 | 6/2007 | Bendahan |
| 7,233,682 B2 | 6/2007 | Levine |
| 7,244,941 B2 | 7/2007 | Roos |
| 7,257,189 B2 | 8/2007 | Modica |
| 7,269,527 B1 | 9/2007 | Frank |
| 7,322,745 B2 | 1/2008 | Agrawal |
| 7,324,921 B2 | 1/2008 | Sugahara |
| 7,356,115 B2 | 4/2008 | Ford |
| 7,356,174 B2 | 4/2008 | Leue |
| 7,366,282 B2 | 4/2008 | Peschmann |
| 7,369,643 B2 | 5/2008 | Kotowski |
| 7,379,530 B2 | 5/2008 | Hoff |
| 7,391,028 B1 | 6/2008 | Rubenstein |
| 7,397,891 B2 | 7/2008 | Johnson |
| 7,400,701 B1 | 7/2008 | Cason |
| 7,411,198 B1 | 8/2008 | Holland |
| 7,417,440 B2 | 8/2008 | Peschmann |
| 7,418,077 B2 | 8/2008 | Gray |
| 7,430,479 B1 | 9/2008 | Holslin |
| 7,453,987 B1 | 11/2008 | Richardson |
| 7,471,764 B2 | 12/2008 | Kaval |
| 7,483,510 B2 | 1/2009 | Carver |
| 7,486,768 B2 | 2/2009 | Allman |
| 7,517,149 B2 | 4/2009 | Agrawal |

(56) References Cited

U.S. PATENT DOCUMENTS

| | | |
|---|---|---|
| 7,519,148 B2 | 4/2009 | Kotowski |
| 7,525,101 B2 | 4/2009 | Grodzins |
| 7,526,064 B2 | 4/2009 | Akery |
| 7,529,341 B2 | 5/2009 | Schlomka |
| 7,550,738 B1 | 6/2009 | DeVito |
| 7,579,845 B2 | 8/2009 | Peschmann |
| 7,592,601 B2 | 9/2009 | Frank |
| 7,660,388 B2 | 2/2010 | Gray |
| 7,720,194 B2 | 5/2010 | Connelly |
| 7,720,195 B2 | 5/2010 | Allman |
| 7,734,066 B2 | 6/2010 | Delia |
| 7,734,102 B2 | 6/2010 | Bergeron |
| 7,742,568 B2 | 6/2010 | Smith |
| 7,759,649 B2 | 7/2010 | Frank |
| 7,769,132 B1 | 8/2010 | Hurd |
| 7,769,133 B2 | 8/2010 | Carver |
| 7,783,004 B2 | 8/2010 | Kotowski |
| 7,783,005 B2 | 8/2010 | Kaval |
| 7,792,248 B2 | 9/2010 | Strecker |
| 7,813,540 B1 | 10/2010 | Kraft |
| 7,817,776 B2 | 10/2010 | Agrawal |
| 7,851,766 B2 | 12/2010 | Frank |
| 7,856,081 B2 | 12/2010 | Peschmann |
| 7,860,213 B2 | 12/2010 | Akery |
| 7,876,879 B2 | 1/2011 | Morton |
| 7,876,880 B2 | 1/2011 | Kotowski |
| 7,899,232 B2 | 3/2011 | Gudmundson |
| 7,915,596 B2 | 3/2011 | Clothier |
| 7,928,400 B1 | 4/2011 | Diawara |
| 7,963,695 B2 | 6/2011 | Kotowski |
| 7,973,697 B2 | 7/2011 | Reilly |
| 7,982,191 B2 | 7/2011 | Friedman |
| 7,991,133 B2 | 8/2011 | Mills |
| 7,995,705 B2 | 8/2011 | Allman |
| 8,054,938 B2 | 11/2011 | Kaval |
| 8,059,781 B2 | 11/2011 | Agrawal |
| 8,073,099 B2 | 12/2011 | Niu |
| 8,135,110 B2 | 3/2012 | Morton |
| 8,138,770 B2 | 3/2012 | Peschmann |
| 8,170,177 B2 | 5/2012 | Akery |
| 8,173,970 B2 | 5/2012 | Inbar |
| 8,243,167 B2 | 8/2012 | Liang |
| 8,243,876 B2 | 8/2012 | Morton |
| 8,275,091 B2 | 9/2012 | Morton |
| 8,304,740 B1 | 11/2012 | Frank |
| 8,356,937 B2 | 1/2013 | Kotowski |
| 8,385,501 B2 | 2/2013 | Allman |
| 8,389,942 B2 | 3/2013 | Morton |
| 8,428,217 B2 | 4/2013 | Peschmann |
| 8,433,036 B2 | 4/2013 | Morton |
| 8,457,275 B2 | 6/2013 | Akery |
| 8,472,583 B2 | 6/2013 | Star-Lack |
| 8,483,356 B2 | 7/2013 | Bendahan |
| 8,491,189 B2 | 7/2013 | Kotowski |
| 8,503,605 B2 | 8/2013 | Morton |
| 8,579,506 B2 | 11/2013 | Morton |
| 8,644,453 B2 | 2/2014 | Morton |
| 8,668,386 B2 | 3/2014 | Morton |
| 8,674,706 B2 | 3/2014 | Peschmann |
| 8,687,765 B2 | 4/2014 | Kotowski |
| 8,735,833 B2 | 5/2014 | Morto |
| 8,750,452 B2 | 6/2014 | Kaval |
| 8,774,357 B2 | 7/2014 | Morton |
| 8,798,232 B2 | 8/2014 | Bendahan |
| 8,831,176 B2 | 9/2014 | Morto |
| 8,837,670 B2 | 9/2014 | Akery |
| 8,840,303 B2 | 9/2014 | Morton |
| 8,908,831 B2 | 12/2014 | Bendahan |
| 8,929,509 B2 | 1/2015 | Morton |
| 8,958,526 B2 | 2/2015 | Morton |
| 8,971,485 B2 | 3/2015 | Morton |
| 8,993,970 B2 | 3/2015 | Morton |
| 9,020,095 B2 | 4/2015 | Morton |
| 9,020,096 B2 | 4/2015 | Allman |
| 9,025,731 B2 | 5/2015 | Kotowski |
| 9,042,511 B2 | 5/2015 | Peschmann |
| 9,052,403 B2 | 6/2015 | Morton |
| 9,057,679 B2 | 6/2015 | Morton |
| 9,086,497 B2 | 7/2015 | Bendahan |
| 9,111,331 B2 | 8/2015 | Parikh |
| 9,121,958 B2 | 9/2015 | Morton |
| 9,158,027 B2 | 10/2015 | Morton |
| 9,218,933 B2 | 12/2015 | Langeveld |
| 9,223,049 B2 | 12/2015 | Kotowski |
| 9,223,050 B2 | 12/2015 | Kaval |
| 9,223,052 B2 | 12/2015 | Morton |
| 9,268,058 B2 | 2/2016 | Peschmann |
| 9,274,065 B2 | 3/2016 | Morton |
| 9,279,901 B2 | 3/2016 | Akery |
| 9,285,498 B2 | 3/2016 | Carver |
| 9,310,322 B2 | 4/2016 | Panesar |
| 9,310,323 B2 | 4/2016 | Bendahan |
| 9,316,760 B2 | 4/2016 | Bendahan |
| 9,329,285 B2 | 5/2016 | Gozani |
| 9,332,624 B2 | 5/2016 | Morton |
| 2001/0016030 A1 | 8/2001 | Nicolas |
| 2001/0021013 A1 | 9/2001 | Hecht |
| 2001/0021244 A1 | 9/2001 | Suzuki |
| 2001/0028696 A1 | 10/2001 | Yamada |
| 2001/0033636 A1 | 10/2001 | Hartick |
| 2001/0038681 A1 | 11/2001 | Stanton |
| 2001/0038705 A1 | 11/2001 | Rubbert |
| 2001/0038707 A1 | 11/2001 | Ohara |
| 2001/0048734 A1 | 12/2001 | Uppaluri |
| 2001/0053197 A1 | 12/2001 | Murayama |
| 2002/0000916 A1* | 1/2002 | Richards ............... G01S 5/0036 340/572.1 |
| 2002/0001366 A1 | 1/2002 | Tamura |
| 2002/0015475 A1 | 2/2002 | Matsumoto |
| 2002/0016546 A1 | 2/2002 | Cerofolini |
| 2002/0017620 A1 | 2/2002 | Oomori |
| 2002/0018199 A1 | 2/2002 | Blumenfeld |
| 2002/0024016 A1 | 2/2002 | Endo |
| 2002/0027970 A1 | 3/2002 | Chapman |
| 2002/0028994 A1 | 3/2002 | Kamiyama |
| 2002/0031246 A1 | 3/2002 | Kawano |
| 2002/0037068 A1 | 3/2002 | Oikawa |
| 2002/0044691 A1 | 4/2002 | Matsugu |
| 2002/0049660 A1 | 4/2002 | Obrador |
| 2002/0054694 A1 | 5/2002 | Vachtsevanos |
| 2002/0067259 A1 | 6/2002 | Fufidio |
| 2002/0067793 A1 | 6/2002 | Stierstorfer |
| 2002/0085046 A1 | 7/2002 | Furuta |
| 2002/0088952 A1 | 7/2002 | Rao |
| 2002/0094062 A1 | 7/2002 | Dolazza |
| 2002/0094064 A1 | 7/2002 | Zhou |
| 2002/0094119 A1 | 7/2002 | Sahadevan |
| 2002/0098518 A1 | 7/2002 | Levinson |
| 2002/0106052 A1 | 8/2002 | Menhardt |
| 2002/0122528 A1 | 9/2002 | Besson |
| 2002/0124664 A1 | 9/2002 | Call |
| 2002/0126800 A1 | 9/2002 | Matsumoto |
| 2002/0127586 A1 | 9/2002 | Mortensen |
| 2002/0141625 A1 | 10/2002 | Nelson |
| 2002/0150200 A1 | 10/2002 | Zonneveld |
| 2002/0161534 A1 | 10/2002 | Adler |
| 2002/0168083 A1 | 11/2002 | Garms |
| 2002/0168657 A1 | 11/2002 | Chen |
| 2002/0172324 A1 | 11/2002 | Ellengogen |
| 2002/0172409 A1 | 11/2002 | Saito |
| 2002/0175291 A1 | 11/2002 | Reeder |
| 2002/0175921 A1 | 11/2002 | Xu |
| 2002/0176351 A1 | 11/2002 | Masaki |
| 2002/0176534 A1 | 11/2002 | Meder |
| 2002/0186862 A1 | 12/2002 | McClelland |
| 2002/0188197 A1 | 12/2002 | Bishop |
| 2002/0191209 A1 | 12/2002 | Yasumaru |
| 2002/0198731 A1 | 12/2002 | Barnes |
| 2003/0012420 A1 | 1/2003 | Verwoerd |
| 2003/0023469 A1 | 1/2003 | Lee |
| 2003/0023592 A1 | 1/2003 | Modica |
| 2003/0024315 A1 | 2/2003 | Merkel |
| 2003/0031289 A1 | 2/2003 | Hsieh |
| 2003/0031291 A1 | 2/2003 | Yamamoto |

(56) References Cited

U.S. PATENT DOCUMENTS

| | | |
|---|---|---|
| 2003/0036006 A1 | 2/2003 | Feke |
| 2003/0038945 A1 | 2/2003 | Mahner |
| 2003/0043964 A1 | 3/2003 | Sorenson |
| 2003/0068557 A1 | 4/2003 | Kumashiro |
| 2003/0072414 A1 | 4/2003 | Sakaida |
| 2003/0072418 A1 | 4/2003 | Albagli |
| 2003/0072484 A1 | 4/2003 | Kokko |
| 2003/0076924 A1 | 4/2003 | Mario |
| 2003/0081720 A1 | 5/2003 | Swift |
| 2003/0081859 A1 | 5/2003 | Kasutani |
| 2003/0082516 A1 | 5/2003 | Straus |
| 2003/0085163 A1 | 5/2003 | Chan |
| 2003/0085348 A1 | 5/2003 | Megerle |
| 2003/0085353 A1 | 5/2003 | Almogy |
| 2003/0091145 A1 | 5/2003 | Mohr |
| 2003/0095633 A1 | 5/2003 | VanWoezik |
| 2003/0095692 A1 | 5/2003 | Mundy |
| 2003/0108150 A1 | 6/2003 | Franke |
| 2003/0128812 A1 | 7/2003 | Appleby |
| 2003/0138147 A1 | 7/2003 | Ongkojoyo |
| 2003/0144800 A1 | 7/2003 | Davis |
| 2003/0148393 A1 | 8/2003 | Woodbury |
| 2003/0149346 A1 | 8/2003 | Arnone |
| 2003/0165213 A1 | 9/2003 | Maglich |
| 2003/0179853 A1 | 9/2003 | Amemiya |
| 2003/0194121 A1 | 10/2003 | Eberhard |
| 2003/0201394 A1 | 10/2003 | Peoples |
| 2003/0205676 A1 | 11/2003 | Nelson |
| 2003/0206649 A1 | 11/2003 | Moshe |
| 2003/0210139 A1 | 11/2003 | Brooks |
| 2003/0215051 A1 | 11/2003 | Suzuki |
| 2003/0215054 A1 | 11/2003 | Fenkart |
| 2003/0215143 A1 | 11/2003 | Zakrzewski |
| 2003/0231788 A1 | 12/2003 | Yukhin |
| 2003/0231791 A1 | 12/2003 | Torre-Bueno |
| 2004/0012853 A1 | 1/2004 | Garcia |
| 2004/0013239 A1 | 1/2004 | Gregerson |
| 2004/0016271 A1 | 1/2004 | Shah |
| 2004/0017882 A1 | 1/2004 | Misawa |
| 2004/0017883 A1 | 1/2004 | Takagi |
| 2004/0017888 A1 | 1/2004 | Seppi |
| 2004/0017935 A1 | 1/2004 | Avinash |
| 2004/0022425 A1 | 2/2004 | Avinash |
| 2004/0027127 A1 | 2/2004 | Mills |
| 2004/0037462 A1 | 2/2004 | Lewis |
| 2004/0041082 A1 | 3/2004 | Harmon |
| 2004/0051030 A1 | 3/2004 | Olszak |
| 2004/0051265 A1 | 3/2004 | Nadeau |
| 2004/0062342 A1 | 4/2004 | Cahill |
| 2004/0062349 A1 | 4/2004 | Schuster |
| 2004/0062351 A1 | 4/2004 | Yoshioka |
| 2004/0066882 A1 | 4/2004 | Eberhard |
| 2004/0066884 A1 | 4/2004 | HermannClaus |
| 2004/0066890 A1 | 4/2004 | Dalmijn |
| 2004/0075058 A1 | 4/2004 | Blevis |
| 2004/0080315 A1 | 4/2004 | Beevor |
| 2004/0082846 A1 | 4/2004 | Johnson |
| 2004/0083958 A1 | 5/2004 | Saidman |
| 2004/0086075 A1 | 5/2004 | Hein |
| 2004/0086078 A1 | 5/2004 | Adams |
| 2004/0086160 A1 | 5/2004 | Zimmermann |
| 2004/0087844 A1 | 5/2004 | Yen |
| 2004/0101097 A1 | 5/2004 | Wakayama |
| 2004/0101098 A1 | 5/2004 | Bijjani |
| 2004/0102700 A1 | 5/2004 | Asafusa |
| 2004/0109231 A1 | 6/2004 | Haisch |
| 2004/0119591 A1 | 6/2004 | Peeters |
| 2004/0120009 A1 | 6/2004 | White |
| 2004/0120454 A1 | 6/2004 | Ellenbogen |
| 2004/0120857 A1 | 6/2004 | Smith |
| 2004/0126895 A1 | 7/2004 | Overbeck |
| 2004/0134986 A1 | 7/2004 | Studer |
| 2004/0141056 A1 | 7/2004 | Izumi |
| 2004/0141584 A1 | 7/2004 | Bernardi |
| 2004/0142386 A1 | 7/2004 | Rigler |
| 2004/0148137 A1 | 7/2004 | Zerwekh |
| 2004/0160599 A1 | 8/2004 | Hamamatsu |
| 2004/0161073 A1 | 8/2004 | Nokita |
| 2004/0175041 A1 | 9/2004 | Miller |
| 2004/0176677 A1 | 9/2004 | Hwu |
| 2004/0179647 A1 | 9/2004 | Zhao |
| 2004/0202154 A1 | 10/2004 | Aklepi |
| 2004/0212492 A1 | 10/2004 | Boesch |
| 2004/0212499 A1 | 10/2004 | Bohinc |
| 2004/0213377 A1 | 10/2004 | Endo |
| 2004/0213600 A1 | 10/2004 | Watanabe |
| 2004/0218729 A1 | 11/2004 | Xue |
| 2004/0225222 A1 | 11/2004 | Zeng |
| 2004/0232054 A1 | 11/2004 | Brown |
| 2004/0236520 A1 | 11/2004 | Williams |
| 2004/0240612 A1 | 12/2004 | Suzuki |
| 2004/0247071 A1 | 12/2004 | Dafni |
| 2004/0247171 A1 | 12/2004 | Hashimoto |
| 2004/0251415 A1 | 12/2004 | Verbinski |
| 2004/0252024 A1 | 12/2004 | Huey |
| 2004/0252870 A1 | 12/2004 | Reeves |
| 2004/0253660 A1 | 12/2004 | Gibbs |
| 2004/0256565 A1 | 12/2004 | Adams |
| 2004/0258198 A1 | 12/2004 | Carver |
| 2004/0258202 A1 | 12/2004 | Wernick |
| 2004/0263379 A1 | 12/2004 | Keller |
| 2004/0264624 A1 | 12/2004 | Tanaka |
| 2004/0264648 A1 | 12/2004 | Claus |
| 2004/0265175 A1 | 12/2004 | Witty |
| 2005/0001728 A1 | 1/2005 | Appelt |
| 2005/0008119 A1 | 1/2005 | McClelland |
| 2005/0008203 A1 | 1/2005 | Dixon |
| 2005/0011849 A1 | 1/2005 | Chattey |
| 2005/0017181 A1 | 1/2005 | Kearfott |
| 2005/0018812 A1 | 1/2005 | Wolfs |
| 2005/0023477 A1 | 2/2005 | Archer |
| 2005/0023479 A1 | 2/2005 | Grodzins |
| 2005/0024199 A1 | 2/2005 | Huey |
| 2005/0025280 A1 | 2/2005 | Schulte |
| 2005/0025350 A1 | 2/2005 | Engelbart |
| 2005/0025377 A1 | 2/2005 | Avinash |
| 2005/0029460 A1 | 2/2005 | Iwatschenko-Borho |
| 2005/0031069 A1 | 2/2005 | Kaucic |
| 2005/0031076 A1 | 2/2005 | McClelland |
| 2005/0053307 A1 | 3/2005 | Nose |
| 2005/0057354 A1 | 3/2005 | Jenkins |
| 2005/0058242 A1 | 3/2005 | Peschmann |
| 2005/0058350 A1 | 3/2005 | Dugan |
| 2005/0061955 A1 | 3/2005 | Endo |
| 2005/0069085 A1 | 3/2005 | Lewis |
| 2005/0074088 A1 | 4/2005 | Ichihara |
| 2005/0085721 A1 | 4/2005 | Fauver |
| 2005/0094856 A1 | 5/2005 | Warren |
| 2005/0098728 A1 | 5/2005 | Alfano |
| 2005/0100135 A1 | 5/2005 | Lowman |
| 2005/0105665 A1 | 5/2005 | Grodzins |
| 2005/0105680 A1 | 5/2005 | Nabors |
| 2005/0110672 A1 | 5/2005 | Cardiasmenos |
| 2005/0111618 A1 | 5/2005 | Sommer |
| 2005/0113961 A1 | 5/2005 | Sabol |
| 2005/0117683 A1 | 6/2005 | Mishin |
| 2005/0117693 A1 | 6/2005 | Miyano |
| 2005/0117700 A1 | 6/2005 | Peschmann |
| 2005/0123093 A1 | 6/2005 | Lawaczeck |
| 2005/0123174 A1 | 6/2005 | Gorsky |
| 2005/0128069 A1 | 6/2005 | Skatter |
| 2005/0133708 A1 | 6/2005 | Eberhard |
| 2005/0135535 A1 | 6/2005 | Wallace |
| 2005/0135668 A1 | 6/2005 | Polichar |
| 2005/0147199 A1 | 7/2005 | Dunham |
| 2005/0153356 A1 | 7/2005 | Okawa |
| 2005/0156734 A1 | 7/2005 | Zerwekh |
| 2005/0157842 A1 | 7/2005 | Agrawal |
| 2005/0157844 A1 | 7/2005 | Bernardi |
| 2005/0163354 A1 | 7/2005 | Ziegler |
| 2005/0169421 A1 | 8/2005 | Muenchau |
| 2005/0173284 A1 | 8/2005 | Ambrefe |
| 2005/0189412 A1 | 9/2005 | Hudnut |
| 2005/0190882 A1 | 9/2005 | McGuire |

(56) References Cited

U.S. PATENT DOCUMENTS

| | | |
|---|---|---|
| 2005/0198226 A1 | 9/2005 | Delia |
| 2005/0205793 A1 | 9/2005 | Bohinc |
| 2005/0206514 A1 | 9/2005 | Zanovitch |
| 2005/0207655 A1 | 9/2005 | Chopra |
| 2005/0212913 A1 | 9/2005 | Richter |
| 2005/0216294 A1* | 9/2005 | Labow ............... G06Q 10/08 705/333 |
| 2005/0219523 A1 | 10/2005 | Onuma |
| 2005/0220247 A1 | 10/2005 | Ruddy |
| 2005/0220264 A1 | 10/2005 | Homegger |
| 2005/0224719 A1 | 10/2005 | Polichar |
| 2005/0226375 A1 | 10/2005 | Eberhard |
| 2005/0240858 A1 | 10/2005 | Croft |
| 2005/0248450 A1 | 11/2005 | Zanovitch |
| 2005/0249416 A1 | 11/2005 | Leue |
| 2005/0251397 A1 | 11/2005 | Zanovitch |
| 2005/0251398 A1 | 11/2005 | Zanovitch |
| 2005/0258372 A1 | 11/2005 | McGregor |
| 2005/0259868 A1 | 11/2005 | Sones |
| 2005/0265517 A1 | 12/2005 | Gary |
| 2005/0271184 A1 | 12/2005 | Ovadia |
| 2005/0275545 A1 | 12/2005 | Alioto |
| 2005/0275831 A1 | 12/2005 | Silver |
| 2005/0276443 A1 | 12/2005 | Slamani |
| 2005/0279936 A1 | 12/2005 | Litman |
| 2005/0283079 A1 | 12/2005 | Steen |
| 2006/0000911 A1 | 1/2006 | Stekel |
| 2006/0002504 A1 | 1/2006 | DeMan |
| 2006/0008054 A1 | 1/2006 | Ohara |
| 2006/0009269 A1 | 1/2006 | Hoskinson |
| 2006/0013455 A1 | 1/2006 | Watson |
| 2006/0013464 A1 | 1/2006 | Ramsay |
| 2006/0017605 A1 | 1/2006 | Lovberg |
| 2006/0018434 A1 | 1/2006 | Jacobs |
| 2006/0018517 A1 | 1/2006 | Chen |
| 2006/0019409 A1 | 1/2006 | Nelson |
| 2006/0027751 A1 | 2/2006 | Kurita |
| 2006/0034503 A1 | 2/2006 | Shimayama |
| 2006/0036167 A1 | 2/2006 | Shina |
| 2006/0045235 A1 | 3/2006 | Bruder |
| 2006/0045323 A1 | 3/2006 | Ateya |
| 2006/0056584 A1 | 3/2006 | Allman |
| 2006/0064246 A1 | 3/2006 | Medberry |
| 2006/0065844 A1 | 3/2006 | Zelakiewicz |
| 2006/0072702 A1 | 4/2006 | Chapman |
| 2006/0083418 A1 | 4/2006 | Watson |
| 2006/0084872 A1 | 4/2006 | Ichikawa |
| 2006/0086794 A1 | 4/2006 | Knowles |
| 2006/0093088 A1 | 5/2006 | Sowerby |
| 2006/0097171 A1 | 5/2006 | Balchunas |
| 2006/0098773 A1 | 5/2006 | Peschmann |
| 2006/0098842 A1 | 5/2006 | Levine |
| 2006/0098866 A1 | 5/2006 | Whitson |
| 2006/0109949 A1 | 5/2006 | Tkaczyk |
| 2006/0114477 A1 | 6/2006 | Cox |
| 2006/0115044 A1 | 6/2006 | Wu |
| 2006/0115109 A1 | 6/2006 | Whitson |
| 2006/0116566 A1 | 6/2006 | Bruijns |
| 2006/0119837 A1 | 6/2006 | Raguin |
| 2006/0133650 A1 | 6/2006 | Xie |
| 2006/0133659 A1 | 6/2006 | Hammond |
| 2006/0138331 A1 | 6/2006 | Guillebaud |
| 2006/0140341 A1 | 6/2006 | Carver |
| 2006/0141615 A1 | 6/2006 | Lu |
| 2006/0142662 A1 | 6/2006 | VanBeek |
| 2006/0142984 A1 | 6/2006 | Weese |
| 2006/0173268 A1 | 8/2006 | Mullick |
| 2006/0176062 A1 | 8/2006 | Yang |
| 2006/0182221 A1 | 8/2006 | Bernhardt |
| 2006/0203960 A1 | 9/2006 | Schlomka |
| 2006/0204080 A1 | 9/2006 | Sones |
| 2006/0215811 A1 | 9/2006 | Modica |
| 2006/0249685 A1 | 11/2006 | Tanaka |
| 2006/0255929 A1 | 11/2006 | Zanovitch |
| 2006/0257005 A1 | 11/2006 | Bergeron |
| 2006/0262902 A1 | 11/2006 | Wattenburg |
| 2006/0269135 A1 | 11/2006 | Ramsay |
| 2006/0273257 A1 | 12/2006 | Roos |
| 2006/0274916 A1 | 12/2006 | Chan |
| 2006/0282886 A1 | 12/2006 | Gaug |
| 2006/0284094 A1 | 12/2006 | Inbar |
| 2007/0001123 A1 | 1/2007 | Andrews |
| 2007/0003122 A1 | 1/2007 | Sirohey |
| 2007/0058037 A1 | 3/2007 | Bergeron |
| 2007/0083414 A1 | 4/2007 | Krohn |
| 2007/0085010 A1 | 4/2007 | Letant |
| 2007/0118399 A1 | 5/2007 | Avinash |
| 2007/0140423 A1 | 6/2007 | Foland |
| 2007/0147585 A1 | 6/2007 | Eilbert |
| 2007/0156281 A1 | 7/2007 | Leung |
| 2007/0165777 A1 | 7/2007 | Anwar |
| 2007/0168467 A1 | 7/2007 | Hu |
| 2007/0172129 A1 | 7/2007 | Tortora |
| 2007/0189454 A1 | 8/2007 | Georgeson |
| 2007/0194909 A1 | 8/2007 | Garfield |
| 2007/0195994 A1 | 8/2007 | McClelland |
| 2007/0200566 A1 | 8/2007 | Clark |
| 2007/0206719 A1 | 9/2007 | Suryanarayanan |
| 2007/0210255 A1 | 9/2007 | Bjorkholm |
| 2007/0210921 A1 | 9/2007 | Volpi |
| 2007/0228284 A1 | 10/2007 | Polichar |
| 2007/0237293 A1 | 10/2007 | Singh |
| 2007/0269005 A1 | 11/2007 | Chalmers |
| 2007/0280502 A1 | 12/2007 | Paresi |
| 2007/0290136 A1 | 12/2007 | Ivan |
| 2008/0023631 A1 | 1/2008 | Majors |
| 2008/0037707 A1 | 2/2008 | Rothschild |
| 2008/0048872 A1 | 2/2008 | Frank |
| 2008/0075230 A1 | 3/2008 | Oreper |
| 2008/0084963 A1 | 4/2008 | Clayton |
| 2008/0118021 A1 | 5/2008 | Dutta |
| 2008/0128624 A1 | 6/2008 | Cooke |
| 2008/0130839 A1* | 6/2008 | Rogers ................ G06T 7/001 378/207 |
| 2008/0152082 A1 | 6/2008 | Bouchard |
| 2008/0159591 A1 | 7/2008 | Ruedin |
| 2008/0170670 A1 | 7/2008 | Bhatt |
| 2008/0198967 A1 | 8/2008 | Connelly |
| 2008/0198970 A1 | 8/2008 | Kirshner |
| 2008/0205594 A1 | 8/2008 | Bjorkholm |
| 2008/0230709 A1 | 9/2008 | Tkaczyk |
| 2008/0236275 A1 | 10/2008 | Breed |
| 2008/0253653 A1 | 10/2008 | Gable |
| 2008/0260097 A1 | 10/2008 | Anwar |
| 2008/0304622 A1 | 12/2008 | Morton |
| 2009/0014662 A1 | 1/2009 | Suhami |
| 2009/0034790 A1 | 2/2009 | Song |
| 2009/0067575 A1 | 3/2009 | Seppi |
| 2009/0086907 A1 | 4/2009 | Smith |
| 2009/0116617 A1 | 5/2009 | Mastronardi |
| 2009/0127459 A1 | 5/2009 | Neustadter |
| 2009/0168964 A1 | 7/2009 | Safai |
| 2009/0174554 A1 | 7/2009 | Bergeron |
| 2009/0236531 A1 | 9/2009 | Frank |
| 2009/0238336 A1 | 9/2009 | Akery |
| 2009/0245462 A1 | 10/2009 | Agrawal |
| 2009/0257555 A1 | 10/2009 | Chalmers |
| 2009/0283690 A1 | 11/2009 | Bendahan |
| 2009/0285353 A1 | 11/2009 | Ellenbogen |
| 2009/0316851 A1 | 12/2009 | Oosaka |
| 2009/0323894 A1 | 12/2009 | Hu |
| 2010/0020937 A1 | 1/2010 | Hautmann |
| 2010/0161504 A1 | 6/2010 | Casey |
| 2010/0177868 A1 | 7/2010 | Smith |
| 2010/0177873 A1 | 7/2010 | Chen |
| 2010/0295689 A1* | 11/2010 | Armistead, Jr. ..... G06K 9/4671 340/600 |
| 2010/0303287 A1* | 12/2010 | Morton ................ G01N 23/046 382/100 |
| 2011/0019797 A1 | 1/2011 | Morton |
| 2011/0019799 A1 | 1/2011 | Shedlock |
| 2011/0038453 A1 | 2/2011 | Morton |
| 2011/0060426 A1 | 3/2011 | Morton |
| 2011/0064192 A1 | 3/2011 | Morton |

(56) References Cited

U.S. PATENT DOCUMENTS

| | | |
|---|---|---|
| 2011/0075808 A1 | 3/2011 | Rothschild |
| 2011/0129063 A1* | 6/2011 | Bendahan ............ G01V 5/0025 378/57 |
| 2011/0172972 A1 | 7/2011 | Gudmundson |
| 2011/0204243 A1 | 8/2011 | Bendahan |
| 2011/0235777 A1 | 9/2011 | Gozani |
| 2011/0266643 A1 | 11/2011 | Engelmann |
| 2012/0093367 A1 | 4/2012 | Gudmundson |
| 2012/0099710 A1 | 4/2012 | Kotowski |
| 2012/0104276 A1 | 5/2012 | Miller |
| 2012/0105267 A1 | 5/2012 | Delia |
| 2012/0116720 A1 | 5/2012 | Klann |
| 2013/0001048 A1 | 1/2013 | Panesar |
| 2014/0185771 A1 | 7/2014 | Morton |
| 2014/0197321 A1 | 7/2014 | Bendahan |
| 2015/0036798 A1 | 2/2015 | Morton |
| 2015/0078519 A1 | 3/2015 | Morton |
| 2015/0301220 A1 | 10/2015 | Morton |
| 2015/0325010 A1 | 11/2015 | Bedford |
| 2015/0355117 A1 | 12/2015 | Morton |
| 2015/0355369 A1 | 12/2015 | Morton |
| 2016/0025889 A1 | 1/2016 | Morton |
| 2016/0033674 A1 | 2/2016 | Allman |

FOREIGN PATENT DOCUMENTS

| | | |
|---|---|---|
| CA | 2307439 C | 7/2008 |
| CN | 101303317 A | 11/2008 |
| EP | 0077018 A1 | 4/1983 |
| EP | 0455177 A2 | 11/1991 |
| EP | 0459648 A1 | 12/1991 |
| EP | 0577380 A1 | 1/1994 |
| EP | 0919186 A2 | 6/1999 |
| EP | 1413898 A1 | 4/2004 |
| EP | 2270547 | 1/2011 |
| GB | 2158572 A | 11/1985 |
| GB | 2255634 A | 11/1992 |
| GB | 2110037 A | 6/1993 |
| GB | 2277013 A | 10/1994 |
| GB | 2368764 A | 5/2002 |
| GB | 2409268 A | 6/2005 |
| GB | 242406 A | 9/2006 |
| GB | 2438317 A | 11/2007 |
| JP | H0422897 A | 1/1992 |
| JP | 2001233440 A | 8/2001 |
| JP | 2003287507 A | 10/2003 |
| JP | 2005257400 | 9/2005 |
| WO | 1992003837 A1 | 3/1992 |
| WO | 9855851 A1 | 12/1998 |
| WO | 2000049428 | 8/2000 |
| WO | 2002082290 A1 | 10/2002 |
| WO | 2003069498 A1 | 8/2003 |
| WO | 2004010127 A1 | 1/2004 |
| WO | 2004010162 A2 | 1/2004 |
| WO | 2003107113 A3 | 5/2004 |
| WO | 2005086616 A2 | 9/2005 |
| WO | 2005098400 A2 | 10/2005 |
| WO | 2006036076 A1 | 4/2006 |
| WO | 2006053279 A2 | 5/2006 |
| WO | 2006078691 A2 | 7/2006 |
| WO | 2006119603 A1 | 11/2006 |
| WO | 2006119605 | 11/2006 |
| WO | 2006119605 A1 | 11/2006 |
| WO | 2007035359 A2 | 3/2007 |
| WO | 2007055720 A2 | 5/2007 |
| WO | 2007068933 A1 | 6/2007 |
| WO | 2007103216 A2 | 9/2007 |
| WO | 2008017983 A2 | 2/2008 |
| WO | 2009106803 A2 | 9/2009 |
| WO | 2009143169 A1 | 11/2009 |
| WO | 2011069024 A1 | 6/2011 |
| WO | 2011091070 A2 | 7/2011 |
| WO | 2013116549 | 8/2013 |
| WO | 2013119423 A1 | 8/2013 |
| WO | 2014107675 | 7/2014 |
| WO | 2014121097 A1 | 8/2014 |
| WO | 2014124152 A2 | 8/2014 |
| WO | 2016011205 | 1/2016 |

OTHER PUBLICATIONS

Office Action for Canadian Patent Application No. 2849398, dated Sep. 21, 2018.

First Office Action for Chinese Patent Application No. CN201280054643.3, dated Aug. 27, 2015.

Third Office Action for Chinese Patent Application No. CN201280054643.3, dated Nov. 22, 2016.

Notification of Re-Examination for CN201280054643.3, dated Apr. 2018.

Notification of Re-Examination for CN201280054643.3, dated Oct. 30, 2018.

Horner et al., "Phase-Only Matched Filtering", Applied Optics, vol. 23, No. 6, Mar. 15, 1994, pp. 812-816.

Mahalanobis, et al. "Minimum Average Correlation Energy Filters", Applied Optics, vol. 26, No. 17, pp. 3633-3640, Sep. 1987.

Kumar et al. "Spatial frequency domain image processing for biometric recognition", Biometrics ICIP Conference 2002.

Caulfield, et al. "Improved Discrimination in Optical Character Recognition", Applied Optics, vol. 8, pp. 2354-2356, Nov. 1969.

Morin, et al. "Optical Character Recognition (OCR) in Uncontrolled Environments Using Optical Correlators", Proc. SPIE Int. Soc. Opt. Eng. 3715, 346; 1999.

ClearView Workstation, L3 Security & Detection Systems, Jun. 9, 2011.

Office Action dated Dec. 27, 2017 for U.S. Appl. No. 15/455,436; (pp. 1-28).

International Search Report for PCT/US10/58809; Rapiscan Systems Inc.; dated Apr. 19, 2011.

Mobile X-Ray Inspection Systems, Internet Citation, Feb. 12, 2007, pp. 1-2, URL:http://web.archive.org/web/20070212000928/http://www.bombdetecti-on.com/cat--details.php?catid=20.

Molchanov P A et al: 'Nanosecond gated optical sensors for ocean optic applications' Sensors Applications Symposium, 2006. Proceedings of The 2006 IEEE Houston, Texas,USA Feb. 7-9, 2006, Piscataway, NJ, USA,IEEE, Feb. 7, 2006 (Feb. 7, 2006) , pp. 147-150, XP010917671 ISBN: 978-0-7803-9580-0.

Smith C. R. et al: 'Application of 450 kV computed tomography to engine blocks with steel liners' Materials Evaluation vol. 65, No. 5, 2007, pp. 458-461, XP055108238.

CRS Report for Congress, Aviation Security Technologies and Procedures: Screening Passengers and Baggage, Oct. 26, 2001, pp. 1-12.

Written Opinion on Patentability for PCT/US11/21758; dated Jul. 7, 2011; Rapiscan Systems.

International Search Report and Written Opinion for PCT/US12/54110, dated Dec. 24, 2012.

International Search Report for PCT/US11/21758; dated Jul. 7, 2011, Rapiscan Systems Inc.

International Search Report for PCT/US13/24191, Rapiscan Systems Inc., dated Jun. 25, 2013.

Written Opinion of the International Searching Authority for PCT/US2014/015126, dated May 27, 2014.

International Search Report for PCT/US13/23676, dated Jun. 28, 2013.

Notice of Allowance dated Mar. 16, 2015 for U.S. Appl. No. 13/606,442.

International Search Report for PCT/GB2009/000497, dated Jan. 22, 2010.

International Search Report for PCT/US14/56652, dated Apr. 27, 2015.

International Preliminary Report on Patentability for PCT/US2014/014198, dated Aug. 4, 2015.

International Preliminary Report on Patentability for PCT/US11/21758, dated Jul. 7, 2011.

International Search Report for PCT/US14/14198, dated May 16, 2014.

(56) References Cited

OTHER PUBLICATIONS

International Search Report for PCT/US2014/015126, dated May 27, 2014.
International Search Report for PCT/US2015/040653, dated Dec. 16, 2015.
International Search Report for PCT/US2014/010370, dated May 13, 2014.
Supplementary European Search Report for EP12830287, dated Feb. 27, 2015.
Examination Report for GB14049951, dated Jun. 26, 2015.
International Search Report for PCT/GB09/00575, dated Apr. 7, 2010.
Examination Report for GB14049951, dated Dec. 4, 2015.
Office Action dated Mar. 7, 2016 for U.S. Appl. No. 14/739,329.
Office Action dated May 14, 2014 for U.S. Appl. No. 13/606,442.
"ClearView Workstation Cargo Inspection Workstation," L-3 Communications Security & Detection Systems, Jul. 27, 2011, 2 pages.
Examination Report for EP12830287.4, dated Jan. 18, 2016.
Office Action for JP2014529885, dated Jan. 28, 2016.
Examination Report for EP12830287.4, dated Oct. 31, 2016.
Examination Report for GB14049951, dated Jun. 27, 2016.
Notice of Allowance dated Dec. 12, 2016 for U.S. Appl. No. 14/739,329.
Office Action dated Jul. 26, 2018 for U.S. Appl. No. 15/455,436 (pp. 1-14).
International Search Report for PCT/US2012/054110, dated Dec. 24, 2012.
Notification of Preliminary Refusal for Korean Patent Application No. 10-2014-70008915, dated Oct. 22, 2018.
International Search Report for PCT/US2017/017642, dated Jun. 29, 2017.
Pre-Examination Report for Brazilian Patent Application No. P1908881-4, dated Nov. 7, 2018.
Viggo Butler and Robert W. Poole, Jr., Rethinking Checked-Baggage Screening, Reason Public Policy Institute, Policy Study 297, Jul. 2002.
McLay, Laura A., Jacobson, Sheldon H., and Kobza, John E., A multilevel passenger screening problem for aviation security, Naval Research Logistics (NRL), vol. 53, issue 3, pp. 183-197, 2006.
Sun Olapiriyakul and Sanchoy Das, Design and analysis of a two-stage security screening and inspection system, Journal of Air Transport Management, vol. 13, Issue 2, Mar. 2007, pp. 67-74.
Kelly Leone and Rongfang (Rachel) Liu, The key design parameters of checked baggage security screening systems in airports, Journal of Air Transport Management, vol. 11, Issue 2, Mar. 2005, pp. 69-78.
Summons to attend oral proceedings for EP097149108, dated Jun. 2, 2015.
First Examination Report for Indian Patent Application No. 6409/DELNP/2010, dated Apr. 26, 2017.
Examination Report for 2304/DELNP/2014, dated Apr. 12, 2018.
Office Action Dated May 13, 2019 for U.S. Appl. No. 16/248,547.

\* cited by examiner

301 — CERTSCAN INSPECTION STATUS DASHBOARD — 307

| CONTAINER/IDENTIFIER | SCANNING | SCANNED | ANALYSIS | COMPLETED | STATUS | COMMENTS |
|---|---|---|---|---|---|---|
| MCCU3746529 | 302 | | | 306 | | |
| LFE-354 | 14:02 | | | | ▨ | 306c |
| HRZU8375274 | 13:40 | 303 13:41 | | | ▨ | |
| MCCU3530682 | 13:35 | 13:36 | 304 13:42 | 305 | ▨ | |
| MCCU2750385 | 13:33 | 13:35 | 13:38 | 13:38 | ▨ | 306a |
| JAB-3857 | 13:28 | 13:29 | 13:30 | 13:37 | ▨ | 306b |
| A294837 | 13:25 | 13:26 | 13:28 | 13:41 | ▨ | VISUAL INSPECTION |
| HRZS3004728 | 13:23 | 13:24 | 13:24 | 13:28 | ▨ | |
| B847397 | 13:20 | 13:21 | 13:24 | 13:27 | ▨ | 306d CLEARED |
| | | | | 13:25 | ▨ | |

FIG. 3

Rapiscan systems
AN OSI SYSTEMS COMPANY

CONTAINER MANIFEST

SCREENING SOLUTIONS

PR-4721

| CERTSCAN | |
|---|---|

ACTIONS
SET LOCATION
SEARCH CONTAINERS

SHIPPER: — 401
[MCROWPR ▼]

402 — CONTAINER #:
[CMCU5559656]

404 — CONTAINER TYPE:
◉ 20 FT  ○ 40 FT

EXPECTED DATE: — 403
[4/26/2011]

EXPORTER NAME: — 405
[CARIBBEAN SHIPPING SERVICES]

CONSIGNEE NAME:
[WALTKOCH LTD]

406

407

408 — [POSSIBLE THREAT]  [IRREGULARITY]  408 — [CLEARED]  [RESCAN REQUIRED]  [CANCEL EDIT]

MANIFEST DATA:

| # | DESCRIPTION | HTS | UNIT | QTY |
|---|---|---|---|---|
| 1 | FROZEN BONELESS CHICKEN | 21069065 | CS | 1260 |

FIG. 4

Rapiscan systems
AN OSI SYSTEMS COMPANY

CERTSCAN | CONTAINER MANIFEST

SCREENING SOLUTIONS  PR-4721

VIEWS

PENDING SCAN RECORDS — 502

COMPLETED SCAN RECORDS — 501

ACTIONS

SET LOCATION

SEARCH CONTAINERS

SEARCH CONTAINERS
— 503

CONTAINER #: [FCIU8488653]

ARRIVAL DATE RANGES: — 504

START DATE: [7/26/2010]    END DATE: [3/3/2011]

[SEARCH]  [CREATE NEW]

OPEN SCANS

| CONTAINER # | CONTAINER TYPE 505 | SHIPPER NAME 506 | VESSEL NAME 507 | EXPECTED ARRIVAL DATE 508 | SCAN TRANSACTION DATE 509 | SCAN RESULT 510 |
|---|---|---|---|---|---|---|
| FCIU8488653 | DEFAULT | MSEA-STAR | BUX-FAVOU-RITE | 02/02/2010 | | |

RECENT SCANS

FIG. 5

| Rapiscan systems | | | | | PR-4721 |
|---|---|---|---|---|---|
| AN OSI SYSTEMS COMPANY | | | | | SCREENING SOLUTIONS |
| CERTSCAN | COMPLETED SCANS | | | | |

VIEWS

COMPLETE SCANS
601

PENDING
SCAN RECORDS

COMPLETED
SCAN RECORDS

ACTIONS

SET LOCATION

SEARCH
CONTAINERS

| | FILTER BY SHIPPER: | ALL ▼ | APPLY FILTER | EXPORT TO EXCEL: | ALL COMPLETE |
|---|---|---|---|---|---|
| | 602 | 603 | 604 | 605 | 606 |

| CONTAINER # | SHIPPER | VESSEL NAME | VOYAGE NUMBER | EXPECTED ARRIVAL DATE |
|---|---|---|---|---|
| FSCU6537824 | MSEASTAR | BUXFAVOURITE | 1002 | 02/02/2010 |
| STRU8331814 | MSEASTAR | EL YUNQUE | EY870S | 02/01/2010 |
| HRZU580059 | MHORIZON | HORIZ CHALLENGER | 503S | 02/05/2010 |
| HLXU4361153 | MSEASTAR | BUXFAVOURITE | 1002 | 02/02/2010 |
| TRLU7176489 | MSEASTAR | BUXFAVOURITE | 1002 | 02/02/2010 |
| HRZU435044 | MHORIZON | HORIZ CHALLENGER | 503S | 02/02/2010 |
| FCIU8488553 | MSEASTAR | BUXFAVOURITE | 1002 | 02/02/2010 |
| SOL25453 | MTRAILER | JAX/SJU BRIDGE | 1962 | 02/04/2010 |
| STRU4886250 | MSEASTAR | EL MORRO | EM940S | 02/05/2010 |

FIG. 6

DISTRIBUTED ANALYSIS X-RAY INSPECTION METHODS AND SYSTEMS

CROSS-REFERENCE

The present application is a continuation application of U.S. patent application Ser. No. 16/248,547, entitled "Distributed Analysis X-Ray Inspection Methods and Systems" and filed on Jan. 15, 2019, which is a continuation application of U.S. patent application Ser. No. 15/455,436, entitled "X-Ray Inspection System That Integrates Manifest Data With Imaging/Detection Processing", filed on Mar. 10, 2017, and issued as U.S. Pat. No. 10,422,919 on Sep. 24, 2019, which is a continuation application of U.S. patent application Ser. No. 14/739,329, of the same title, filed on Jun. 15, 2015, and issued as U.S. Pat. No. 9,632,206 on Apr. 25, 2017, which is a continuation application of U.S. patent application Ser. No. 13/606,442, of the same title, filed on Sep. 7, 2012, and issued as U.S. Pat. No. 9,111,331 on Aug. 18, 2015, which, in turn, relies on U.S. Patent Provisional Application No. 61/532,093, entitled "X-Ray Inspection System with Integration of Manifest Data with Imaging/Detection Algorithms" and filed on Sep. 7, 2011, for priority. The above referenced applications are incorporated herein by reference in their entirety.

FIELD

The present specification discloses systems for inspecting goods in containers and, more specifically, to systems that integrate cargo manifest data with imaging and/or detection processes to make inspection decisions and/or generate alarms upon detecting the presence of threat items in cargo.

BACKGROUND

Cargo containers need to be inspected at ports and other points of entry or transportation for contraband such as explosives, narcotics, currency, chemical and nuclear weapons and for cargo-manifest verification. A cargo manifest is a physical or electronic shipping document that accompanies the cargo and provides important descriptive information about the cargo, including bills of lading issued by the carrier or its representative(s), the shipment's consignor and/or consignee, cargo description, amount, value, origin, and/or destination. The accurate detection of contraband with a low false alarm is a daunting task, as these materials often have similar physical characteristics as benign cargo. The percentage of cargo to be inspected is increasing, and because of the currently manually intensive nature of inspections, so is the number of operators.

Security systems are thus limited in their ability to detect contraband, weapons, explosives, and other dangerous objects concealed in cargo. Standard and advanced X-ray systems have difficulty detecting contraband in break-bulk cargo. This difficulty is exacerbated when inspecting larger and oftentimes, cluttered pallets and cargo containers. Computed Tomography (CT) based systems have been shown to be more suitable for the difficult task of detecting aviation-threat explosives in luggage and, more recently, in larger objects. However, the configuration of commonly employed CT systems prevents scaling the system up to long objects such as large cargo containers and large skids.

The problem is further compounded by the fact that as a result of the image modulation according to atomic numbers of various materials, it is common for X-ray imaging systems to produce images with dark areas. Although these dark areas might indicate the presence of threat materials, they yield little information about the exact nature of threat. Also, radiographs produced by conventional X-ray systems are often difficult to interpret because objects are superimposed. Therefore, a trained operator must study and interpret each image to render an opinion on whether or not a target of interest, a threat, is present. Operator fatigue and distraction can compromise detection performance, especially when a large number of such radiographs is to be interpreted, such as at high traffic transit points and ports. Even with automated systems, it becomes difficult to comply with the implied requirement to keep the number of false alarms low, when the system is operated at high throughputs.

Therefore, there is a need to provide an automated detection system that further includes assistance tools to help operators improve their throughput by scrutinizing cargo images more efficiently, thereby increasing detection and analysis speed. There is also a need for such systems to operate with reduced false alarm rates.

SUMMARY

The present application discloses a system for associating and integrating manifest data from cargo and light vehicles with their respective X-ray images that are generated during scanning. Manifest data is automatically imported into the system for each shipment, and helps the security personnel to quickly determine the contents of cargo. In case of a mismatch between cargo contents shown by manifest data and the X-ray images, the cargo may be withheld for further inspection.

In one embodiment, manifest data is imported via an application integrated within an X-ray detection system deployed at checkpoints or service posts. In one embodiment, the application works within the framework of a distributed network, wherein the service post is connected to a regional center, where an operator can analyze the X-ray image of the cargo in conjunction with the manifest data. When the X-ray image and manifest data has been analyzed, the service post which performed the non-intrusive X-ray scan will be notified automatically by the application integrated with the X-ray system. This allows the service post operator to make a decision to either release the cargo or to hold the cargo for further inspection.

In one embodiment, the process of analyzing the X-ray image of the cargo in conjunction with the manifest data is automated.

In one embodiment, the present specification discloses a system for scanning cargo and vehicles, comprising: at least one non-intrusive inspection system for performing a non-intrusive X-ray scan, said non-intrusive inspection system further comprising an application for importing manifest data associated with the cargo or vehicle being scanned; and a processing system for receiving scan images and associated manifest data from the non-intrusive inspection system, and determining from the scan images if the contents of the cargo or vehicle are of the same type as specified in the manifest data. In one embodiment, the system further comprises a server that executes an application for allocating images and manifest data from a service post to a regional center. Further, in one embodiment, each X-ray scan image is associated with a unique identifier before transmission from the service post to the regional center.

In one embodiment, the scan images and manifest data are analyzed by an operator at a regional center to determine if the contents match. Further, the scan images and manifest data are automatically analyzed by an application at a regional center to determine if the contents match.

In one embodiment, scan images, their associated unique identifiers and manifest data, and results of analyses at a regional center are stored in a database.

In another embodiment, the present specification discloses a method for inspecting cargo and vehicles, comprising: scanning a cargo container or vehicle at a service post using non-intrusive system; importing manifest data associated with the cargo or vehicle being scanned; and analyzing said scan images and associated manifest data to determine if the contents of the cargo or vehicle correspond to the same cargo type as specified in the manifest data. In one embodiment, the non-intrusive scanning is performed by an X-ray system.

In another embodiment, the step of analyzing further comprises determining whether a threat item or alarm condition is present. Further, the result of the analysis at a regional center is reported to the service post. Still further, each scan image is associated with a unique identifier before transmission from the service post to a regional center. In addition, the scan images, their associated unique identifiers and manifest data, and results of analyses are stored in a database.

In yet another embodiment, the present specification discloses a method for screening cargo, the method comprising: scanning a cargo container using non-intrusive X-ray system to generate a scan image; importing manifest data associated with the cargo or vehicle being scanned; obtaining cargo code information from manifest data; retrieving stored images associated with said cargo code from an image database; and comparing features of said scan image to features of historically stored images to determine if the contents of the cargo or vehicle match the manifest data. In addition, the method further comprises computing features of cargo content from the generated scan image, including but not limited to, attenuation, texture, atomic number, cargo height, density and atomic number. In one embodiment, the step of comparing further comprises comparing the computed features from the scan image with features associated with historically stored images.

In one embodiment, the computed features are associated with said cargo code, wherein the cargo code is indicative of a type of cargo. Further, the method comprises segregating the generated scan image according to cargo types, if the cargo is associated with more than one cargo code. Still further, each segregated part of the image is compared to historically stored images associated with the corresponding cargo code. Yet still further, the step of comparing said scan image to historically stored images is performed automatically.

The aforementioned and other embodiments of the present shall be described in greater depth in the drawings and detailed description provided below.

BRIEF DESCRIPTION OF THE DRAWINGS

These and other features and advantages of the present invention will be appreciated, as they become better understood by reference to the following detailed description when considered in connection with the accompanying drawings, wherein:

FIG. 3 illustrates an exemplary interface for a service post, as employed in one embodiment of the system described in the present specification;

FIG. 4 depicts an exemplary interface for presenting manifest information, as employed in one embodiment of the system described in the present specification;

FIG. 5 shows an exemplary user interface screen for a data center, as employed in one embodiment of the system described in the present specification;

FIG. 6 shows another exemplary user interface screen for a data center, as employed in one embodiment of the system described in the present specification;

DETAILED DESCRIPTION

Figure 1:
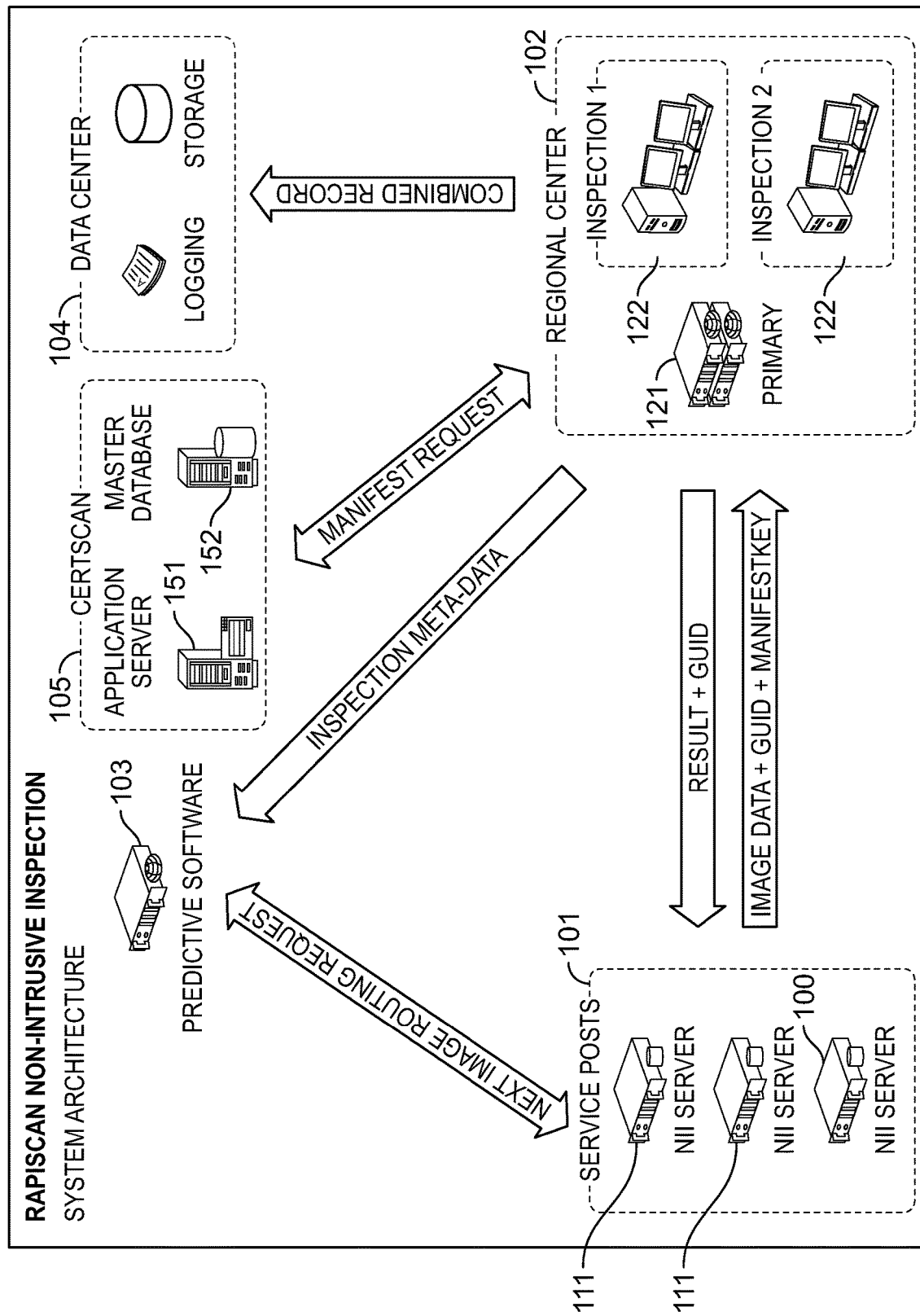
FIG. 1 illustrates the architecture of a distributed inspection network that uses non-intrusive X-ray scanning, according to one embodiment described in the present specification.

In one embodiment, the present specification discloses a system for automatically presenting manifest information when a cargo container or a light vehicle is being inspected using non-intrusive X-ray imaging techniques. This allows the operator or inspector to quickly ascertain and verify the contents of the cargo container or vehicle that is currently being inspected.

In one embodiment, manifest data is imported via an application integrated with an X-ray detection system deployed at checkpoints or service posts. In one embodiment, the application works within the framework of a distributed network, wherein a service post is connected to a regional center, whereby an operator can analyze the X-ray image of the cargo in conjunction with the manifest data. When the X-ray image and manifest data has been analyzed, the service post which performed the non-intrusive X-ray scan will be notified automatically by the application integrated with the X-ray system. This allows the service post operator to make a decision to either release the cargo or to hold the cargo for further inspection.

The present specification discloses multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present specification is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

One of ordinary skill in the art would appreciate that the features described in the present application can operate on any computing platform including, but not limited to: a laptop or tablet computer; personal computer; personal data assistant; cell phone; server; embedded processor; DSP chip or specialized imaging device capable of executing programmatic instructions or code.

It should further be appreciated that the platform provides the functions described in the present application by executing a plurality of programmatic instructions, which are stored in one or more non-volatile memories, using one or more processors and presents and/or receives data through transceivers in data communication with one or more wired or wireless networks.

It should further be appreciated that each computing platform has wireless and wired receivers and transmitters capable of sending and transmitting data, at least one processor capable of processing programmatic instructions, memory capable of storing programmatic instructions, and software comprised of a plurality of programmatic instructions for performing the processes described herein. Additionally, the programmatic code can be compiled (either pre-compiled or compiled "just-in-time") into a single application executing on a single computer, or distributed among several different computers operating locally or remotely to each other.

FIG. 1 illustrates the architecture of a distributed inspection network that uses non-intrusive X-ray scanning. The components of system architecture are described as follows:

Service Post and Regional Center

Referring to FIG. 1, service post 101 is the point where a non-intrusive X-ray scan is performed. In one embodiment, manifest data is imported via an application integrated within an X-ray inspection system deployed at a checkpoint or service posts. It should be noted herein that one exemplary scanning and inspection system that may be employed with the systems and methods of the present invention includes, but is not limited to the Rapiscan Eagle Mobile inspection system. Any suitable system for inspecting cargo, cargo containers, and their contents may be employed. As such, U.S. patent application Ser. Nos. 12/780,910; 13/370,941; 13/548,873; 13/532,862; 13/168,440; 13/175,792; 13/433,270; 13/281,622; 13/108,039; 12/675,471; 12/993,831; 12/993,832; 12/993,834; 12/997,251; 12/919,482; 12/919,483; 12/919,484; 12/919,485; 12/919,486; 12/784,630; 12/784,465; 12/834,890; 13/009,765; 13/032,593; 13/368,178; and 13/368,202, all assigned to the assignee of the present invention represent various systems that may be employed with the present invention and are herein incorporated by reference in their entirety. In addition, U.S. Pat. Nos. 5,638,420; 6,542,580; 7,876,879; 7,949,101; 6,843,599; 7,483,510; 7,769,133; 7,991,113; 6,928,141; 7,517,149; 7,817,776; 7,322,745; 7,720,195; 7,995,705; 7,369,643; 7,519,148; 7,876,879; 7,876,880; 7,860,213; 7,526,064; 7,783,004; 7,963,695; 7,991,113; 8,059,781; 8,135,110, 8,170,177; 8,223,919; and 8,243,876 all assigned to the assignee of the present invention represent various screening systems that may be employed with the present invention are herein incorporated by reference in their entirety.

Service post 101 further comprises at least one, and preferably a set, of non-intrusive inspection (NII) servers 111 through which the service post interfaces with other components of the system. After scanning, the operator responsible for controlling or operating service post 101 can verify that the X-ray image produced by the non-intrusive X-ray scan is of sufficient quality to be effectively analyzed. In one embodiment, the image analysis is performed at the regional center 102. In one embodiment, if the image is incomplete, or is corrupted, black (from attenuating cargo) or is unacceptable in any manner, the service post operator may request a rescan. This can happen in cases where the time between the scan and analysis is close and the truck is still available.

The servers 111 at the service post 101 comprise standard non-intrusive inspection software. When a vehicle is about to be scanned, the software at the service post queries a predicative or routing software application 103 to receive an instruction, routing information, or any other data to identify a target regional center for analysis. The regional center 102 comprises servers 121 and inspection monitors 122. As a new X-ray image is generated at the service post 101, it is transmitted onward from service post 101 to at least one server 121 located at a regional center 102, pursuant to routing information received from the software application 103, for analysis by an inspection operator located at that regional center and for subsequent storage. It should be appreciated that, typically, the regional center 102 and service posts 111 are geographically remote from each other.

In one embodiment, the image is allocated to a regional center and/or an operator within that regional center via the predictive or routing software 103, but the work is only allocated after the image transmission is complete. In one embodiment, to streamline the data transmission activity, predictive software 103 allocates an image to a regional center 102 before the image has been completely generated.

In one embodiment, in the event of the operator becoming unavailable, such as due to PC failure, log off, etc., another operator in the local regional center is selected automatically by the predictive software 103.

Further, the system will fall back on an alternative regional center in the event of a transmission error. In one embodiment, images are buffered until a center comes back on line.

In one embodiment, each X-ray inspection image is associated with a GUID (Globally Unique Identifier), which is a unique ID across all systems. The GUID is used for associating each image with its particular manifest data. In one embodiment, identifying information, such as license plate, CCTV images etc. are also associated with the GUID at the time of scanning. In one embodiment, the GUID is a 128-bit number displayed in hexadecimal. This information may be transmitted to the inspection operators at the regional center, if required.

When the X-ray image and manifest data have been analyzed, the service post 101 which performed the non-intrusive X-ray scan is notified automatically by means of a data transmission from a software application referred to herein as CertScan 105. The CertScan application presents an interface to the operator at the service post 101, which shows the operator a rolling status of all non-intrusive X-ray scans performed at that service post, along with relevant data to allow the service post to either release the cargo or to hold it for further inspection. In one embodiment, the relevant data includes license plate number, work order number, and results of scan. The CertScan application system is also responsible for importing the manifest data associated with the cargo or vehicle being scanned. In one embodiment, manifest data can come in one or more of several forms, such as but not limited to a) a hardcopy of the manifest; b) from a computer owned and connected to the customer database; or c) from a customer database accessed directly by CertScan. The format in which manifest data is supplied depends on the customer, and their local requirements and regulations. This is described in greater detail below with respect to the Collection of Manifest Data.

Predictive Software

The predictive software operates to optimally balance the load distribution of image analysis among multiple regional centers and operators. The predictive software processes metadata from the regional centers and service post connectors to analyze and predict the best distribution of images to operators. For example, predictive software 103 uses historical metadata on inspection queue lengths, workload, contention time and a randomization factor to varying degrees, to allocate work to regional centers and individual operators.

Logging and Validation

At various stages of the process, the system provides localized and centralized logging, auditing, and accounting for each X-ray scanning operator and X-ray image inspection analyst action. Centralized logging is provided at the data center 104. During all steps of the process, from scanning, through inspection to search, the system provides a journal of actions for each non-intrusive X-ray scan and X-ray image inspection analysis.

Inspection Performance and Metrics

In one embodiment, the system records several X-ray image inspection metrics, such as image coverage, tools used, mean time to inspect, time pending, among other variables. These metrics can yield information for operators/image analysts such as what tools were used (for example, zoom, contrast, brightness, and other parameters), how long it took to analyze the image, and/or what part of the image was analyzed using tools. This information can then be applied to measure attentiveness and diligence of operators. For example, this information may be reviewed for each X-ray image inspection analyst, and is useful in training, review and performance evaluation. In one embodiment, inspection metrics may be measured quantitatively and be assigned minimum and maximum values, against which the operators' performance may be evaluated.

Besides helping to assess the proficiencies of the analysts, data logs also allow an assessment of inspection volumes at regional centers and the speed at which analyses are performed.

In one embodiment, the system provides for secondary X-ray image inspection, for a percentage of images, or if required on targeted users. That is, if required in certain cases, the X-ray image inspection process is repeated twice to cross-check results. The second X-ray image inspection can be assigned to either a purely random X-ray image scanning operator, or to nominated workstations for quality and training purposes, in various embodiments. The final X-ray image inspection result would not be sent to the service post until both inspections are complete. If either result is "suspicious", the suspicious result would be recorded, and any disagreement would be flagged.

In one embodiment, training images may be inserted into the workflow to pass on suspicious images to operators as part of their standard workload. The system then carefully segregates the results from these images, without the X-ray scanning operator knowing the difference. This allows for discrete and impromptu training of operators.

If a suspicious finding is communicated back to the service post, the operators can choose to manually open and search the suspicious cargo. In one embodiment, the system allows the operators to record detailed comments about the manual search process, which can provide both useful information about the suspicious cargo and useful feedback to trainers.

CertScan Software Application

Still referring to FIG. 1, the primary goal of the CertScan application 105 is to present manifest information clearly for the non-intrusive X-ray image analysis inspector to quickly ascertain the contents of the cargo container or light vehicle that is currently being inspected. The application 105 runs on an application server 151 and interfaces with a master database 152. In one embodiment, the manifest information and related data that the CertScan application 105 provides may be imported into the master database 152 through any suitable means, such as EDI (Electronic Data Interchange), web services, or OCR scanning of manifest documentation. The manifest information that is provided by these sources includes, but is not limited to, the following data elements:
Container Number
Arrival Date
Shipping Line
Bill of Lading Number
Port of Origin
Exporter
Consignee
Container Manifest Besides use in security inspections, additional related data captured in the CertScan application database 152 may be used for internal statistical analysis, financial forecasting and operational reporting. In one embodiment, application 105 generates various reports, including daily, weekly, and monthly data related to the expected arrival dates of cargo containers and light vehicles, as well as data regarding actual cargo containers and light vehicles scanned. In one embodiment, captured data further includes information such as the number of containers scanned at each site, average to analyze a scan, scans without supporting data, number of scans with threats and without threats, etc. In one embodiment, this data is presented in real time on an user interface, referred to herein as 'Dashboard.

In one embodiment, the use of the CertScan system is extended to provide reporting through online customer portals or electronic data exchange. Additionally, CertScan may also be extended to provide web services for supporting "cloud" type solutions. In one embodiment, web services include obtaining manifest data and publishing or transmitting results of the scan along with any anomalies noted. These additional features are all value-added services for the security scanning system. Thus, the reports provided by the CertScan application may be coupled with x-ray images (JPG) which are produced by the scanning software, to create a combined reporting package. These reports may be provided to customers for their own analysis and audit purposes.

Figure 2:
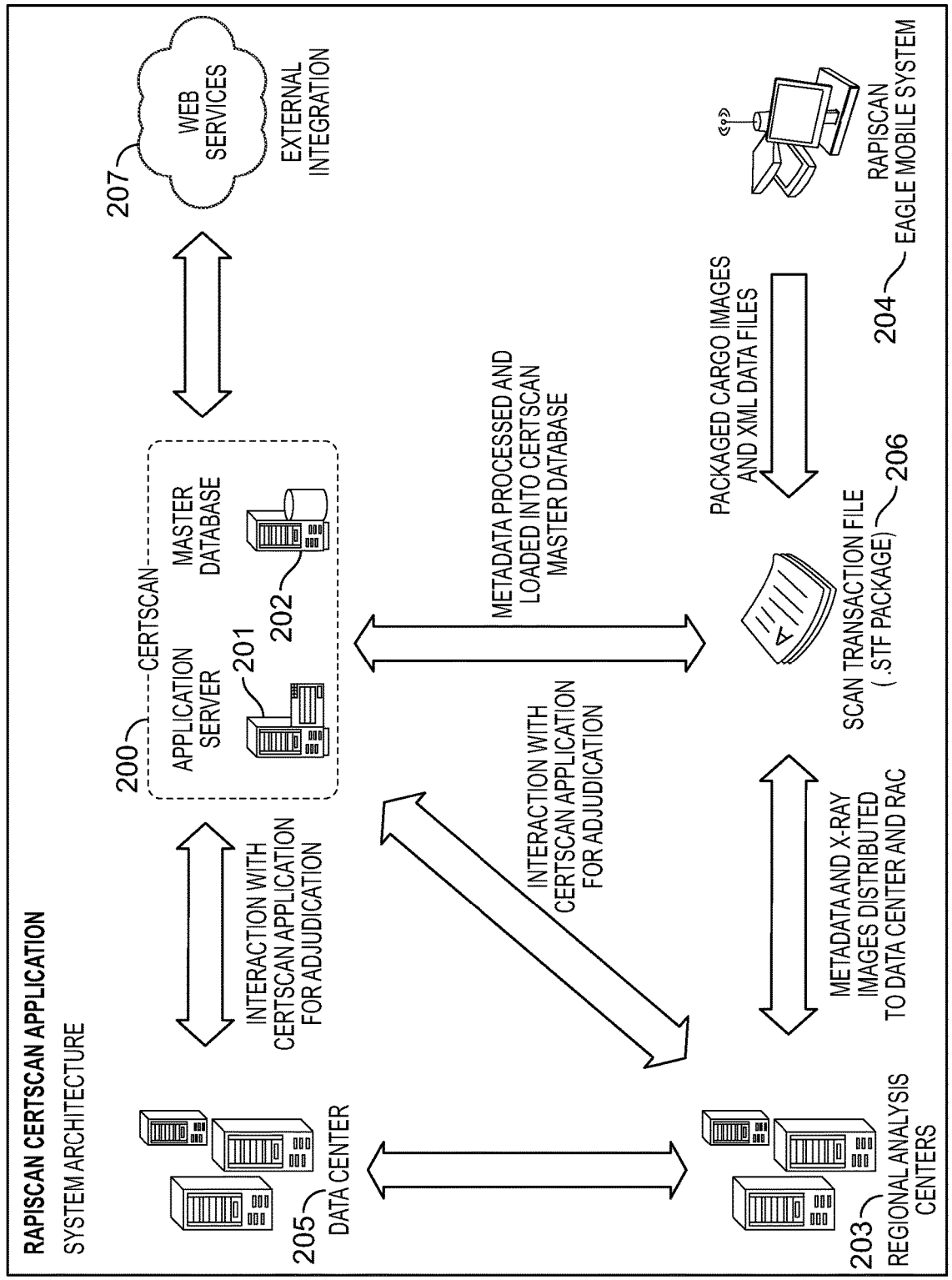
FIG. 2 is a diagram presenting the overall system architecture of the imaging system of described in the present specification, in one embodiment.

FIG. 2 is a diagram presenting the overall system architecture of the CertScan application (shown as 105 in FIG. 1), according to one embodiment of the present invention. The hardware for running the CertScan application 200 includes an application server 201 and a master database 202. The CertScan application provides manifest data to the regional center 203, which is used by the operator in conjunction with the scanned X-ray image to analyze and determine the disposition of the cargo or light vehicles. In one embodiment, each regional center has a graphical user interface (GUI), the CertScan Application Dashboard or CertScan Dashboard, which shows the analyst all the non-intrusive X-ray scans ready for analysis. Using the CertScan Application Dashboard, the image analyst can select the X-ray Image to be analyzed. At the time of selection, CertScan Dashboard displays the cargo and light vehicle manifest data along with its X-ray image. Once adjudication has been determined, the image analyst records the result in a database associated with the CertScan Application. The CertScan Dashboard at the service post 204 which performed the X-ray scan is then updated with the result. The result allows the service post operator to take appropriate action of releasing or holding for further inspection the cargo and light vehicles.

As mentioned earlier, scan images are packaged with metadata and sent from service post 204 to a data center 205 and regional center 203. The metadata is also processed and loaded into CertScan master database 202. In one embodiment, the scan images and metadata are packaged together as a scant transaction file 206, with a '.stf' extension, for easy communication between the service post, regional center, data center and the CertScan application database. In one embodiment, metadata includes information such as time of scan, the operator ID, and whether a rescan is required. This data helps establish how long it takes to transmit images and how long it takes to analyze a scan. This information also enables work quality monitoring and statistical reporting.

In one embodiment, the CertScan primary application is a web-based application which resides at the data center 205. The CertScan Dashboard in the data center displays all non-intrusive X-ray scan being performed and all regional centers, as well as all status information. The data center also serves as the storage location for all X-ray images.

In one embodiment, the CertScan Application is externally integrated with web services 207, which may be used to generate reports as described earlier. In one embodiment, the CertScan application is integrated with the inspection software to provide a comprehensive solution for efficient non-intrusive X-ray inspection.

Collection of Manifest Data

As described above, manifest data can come in one or more of several forms, such as but not limited to a) a hardcopy of the manifest; b) from a computer owned and connected to the customer database; or c) from a customer database accessed directly by CertScan. In one embodiment, the CertScan Application accepts cargo and light vehicle manifest data in multiple formats including, but not limited to:

Electronic Data Interchange
Formatted Data Files (Fixed Width or WL)
Transportation Management System Interfaces
2D Bar Code Reader
Manifest Documentation Some methods, such as Electronic Data Interchange (EDI) of formatted data files may be preferred to facilitate faster import of data into the CertScan master database before the cargo arrives. When using EDI to acquire the cargo container and light vehicle data provided by the customer, data integration is accomplished by importation of a formatted flat file. However the application is designed to support other data exchange formats that are widely accepted by Freight Management Systems (FMS) standards, web services, or OCR scanning of manifest documentation. One of ordinary skill in the art would appreciate that the system may be configured to accept additional or other forms of manifest input.

In one embodiment, a lack of manifest information may be used to detect hidden compartments and contraband such as weapons, nuclear materials, among other contraband. More specifically, in one embodiment, incomplete or otherwise inadequate manifest information may be indicative of cargo that requires further inspection.

Thus, in one embodiment, the present specification includes systems and methods for automatically and rapidly detecting the presence of high-atomic-number (high-Z) materials such as nuclear materials; nuclear weapons; and, shielding materials that may be used to shield radiation emitted by such materials as well as by radiological dispersal devices, which can prevent them from being detected by radiation detectors. The present specification also includes the detection of other types of high-Z materials that may be smuggled in cargo due to their value, such as gold and platinum bullion, and works of art and antiquities containing high-Z materials.

The present specification therefore advantageously employs a threat detection algorithm that uses physical properties such as material density, mass absorption coefficient, and dimension to determine whether high-Z materials are present in the cargo.

The threat detection method and algorithm requires a much shorter analysis time and, thus, allows for higher system throughput compared to a conventional system, which requires an inspector manually reviewing the image or cargo for objects that are highly attenuating. For example, if multiple objects that are highly attenuating are identified, the inspector would need to make contrast enhancements with each object using a computer and input device, such as mouse. Each object has to then be evaluated for its total attenuation (or transmission) value by using the computer to select a region of interest within the object and making an estimate of the average attenuation (or transmission) value, which reflects the total attenuation (or transmission) along the X-ray path through the cargo. Before the net attenuation (or transmission) of the object can be estimated, the attenuation (or transmission) of the surrounding background material has to be analyzed. Then, to generate an average net attenuation (or transmission) of the object, the background must be subtracted from the total attenuation (or added to the transmission). Finally, the inspector must examine the shape and size of the object, and combine these estimates with the estimated net attenuation (or transmission) to reach a conclusion of whether the object represents a threat. This procedure would have to be repeated for each object and, therefore, if performed accurately, would be a very time-intensive procedure.

The threat detection process described in the present specification, in one embodiment, operates by first receiving, on a computing platform, a radiographic image of an object from an X-ray imaging system which typically comprises a radiation source positioned opposite to, or away from, a detector array. At least part of the area bounded by the radiation source and detector array is an inspection region, through which the cargo being inspected passes, or is positioned. In one embodiment, the screening system acquires the original image, which is then processed by the methods described herein. The X-ray imaging system is in electrical communication, either wired or wirelessly, with the computing platform. The threat detection algorithm then performs a first level analysis to generate a first "suspicious object" binary map by measuring a number of physical attributes. Each area on the initial binary map is used as a mask to electronically crop out part of the X-ray radiographic image for analysis, including its surrounding background attenuation (or transmission) and physical characteristics such as attenuation, size, and shape. Then, a decision is made of whether that area or portion could represent a high-Z object. This decision process results in a second binary map, which highlights those regions that represent potential high-Z threats.

In using the threat detection method and algorithm with the methods of the present specification the threat or no-threat decision time ranges from typically less than one second for cargo determined not to have any suspicious objects, to less than approximately 5 seconds for cargo having a plurality of objects or areas of interest. U.S. patent application Ser. No. 12/780,910, entitled "Systems and Methods for Automated, Rapid Detection of High Atomic Number Materials" is herein incorporated by reference in its entirety.

Dashboard for Real-Time Updates

As mentioned earlier, data is presented by the CertScan application in real time through a GUI referred to herein as a "Dashboard". The CertScan Dashboard preferably runs on all the three components of the system—the service post, the regional centers and the data center. In one embodiment, the CertScan Dashboard displays a rolling list of non-intrusive X-ray scans, with data elements that are appropriate for each of the three locations.

In one embodiment, the CertScan application controls the flow of all X-ray image manifest data to ensure all three components have the content and data necessary to carry out their operations.

Service Post Dashboard

FIG. 3 illustrates an exemplary GUI (Dashboard) for the service post that is provided by the CertScan Application. This GUI has the goal of providing the service post operator with the optimal information to assist in deciding if the cargo being scanned is to be released or held for further inspection. Referring to FIG. 3, the data displayed on the Service Post Dashboard may include the container ID number 301, scan start time 302 and scan end time 303, time of start 304 and time of completion 305 of analysis of image and data at the regional center, the status (result) 306, as conveyed by the regional center, and comments 307, if any from the regional center analyst. In one embodiment, the status or result 306 is indicated visually and by means of color coding. Thus, for example, green 306*a* may indicate 'ready to clear', red 306*b* may indicate the need for manual or visual inspection, blue 306*c* may indicated 'under analysis', and yellow 306*d* may represent already 'cleared'.

The CertScan Dashboard located at the service post need not display any information about which regional center performed the X-ray image analysis or the identity of the image analyst who performed the analysis.

Regional Center Dashboard

This CertScan Dashboard aims to provide the regional center image analyst with the information required to quickly and efficiently analyze the X-ray image for potential threats or contraband, and enables the analyst to record the results of the image inspections.

The image analyst uses the CertScan Dashboard to select an X-ray scan ready for analysis. The CertScan Dashboard located at the regional center does not display any information about which service post performed the non-intrusive X-ray scan or the identity of the service post operator who performed the X-ray scan.

In one embodiment, CertScan application interface for the image analyst is designed to be easy to use, and presents manifest information in a manner such that the analyst requires minimal time to evaluate the cargo container and light vehicle manifest data and record scan results.

The CertScan user interface at the regional center is integrated with the inspection software to retrieve the cargo container and light vehicle manifest information once the X-ray scan is complete. An exemplary interface presenting the manifest information to the image analysis inspector is shown in FIG. 4. Referring to FIG. 4, the interface screen provides manifest data such as shipper ID 401, container number 402, expected date of arrival of shipment 403, type (size) of container 404, and names of the exporter 405 and the consignee 406. The screen also includes a manifest table 407 which provides data such as description of item (contents), harmonized tariff schedule (HTS), item unit, and unit quantity.

The X-ray image analysis inspector can thus verify if information about the cargo container and light vehicle matches with the scanned images. The image analysis inspector can then record the inspection result in the interface screen, using the color coded result buttons 408. In most cases the result will be 'Cleared', which is represented by a green button in one embodiment. However, there may be instances where certain areas in the X-ray Image cannot be identified clearly or it is identified that contents that could be harmful. In these cases there are two other results which can be recorded—'Irregularity' or 'Possible Threat', represented by yellow and red respectively, in one embodiment. In one embodiment, blue color is used to indicate 'Rescan required' in case the image is unreadable. This may happen, for example, due to an environmental condition which may affect the quality and clarity of the X-ray image. In this case the cargo and vehicle under inspection need to be scanned again.

Data Center Dashboard

The data center uses the CertScan Dashboard to select an X-ray scan at any point of its lifecycle. The CertScan Dashboard located at the data center displays comprehensive information about the service posts performing the non-intrusive X-ray scan and the regional center where analysis of the X-ray image is being performed.

The CertScan application user interface screens for the Data Center provides all the functionality of the regional center, plus other functions. FIG. 5 shows an exemplary user interface screen for the data center. Referring to FIG. 5, the interface allows the dater center personnel to search for past scan records 501 as well as un-scanned cargo 502 whose manifest data is loaded in the system. The operator may also search for specific details of a cargo by container number 503 or by arrival date range 504. The search yields records for the specific container, which include data such as container type 505, shipper name 506, vessel name 507, expected arrival date 508, scan date 509 and scan results 510.

FIG. 6 illustrates another exemplary screen for the data center that shows completed scans. Referring to FIG. 6, scan records may be filtered by shipper name 601, or other attributes, such as consignee name, exporter name, date of arrival, among other parameters. In one embodiment, the completed scan records include container number 602, shipper name 603, vessel name 604, voyage number 605, and expected arrival date 606.

One of ordinary skill in the art would appreciate that all the interface screens may be customized to meet the customer's needs, and data may be selected for display accordingly.

System Logging

In one embodiment, the CertScan application performs logging of all activities throughout the full non-intrusive X-ray scanning operation. The application log provides information and reports such as:
Timings related to the non-intrusive X-ray scan process
CertScan Application performance monitoring
CertScan Application system health
CertScan Application error traps One of ordinary skill in the art would appreciate that CertScan application log data may be used for internal system monitoring as well as for reporting based on customer needs.

The applications of the present inventions may be extended to security inspection at ports, borders, aviation checkpoints as well as supply chain security. The system can import manifest data from a port, border or aviation data management system, as the case may be, and compare the obtained information with image of container. In one embodiment, the system of present invention automatically applies detection algorithms to the image and provides alerts to operator, if there are any mismatches with the manifest. This 'Operator Assist' function enables the security personnel to identify threats or other contraband more efficiently, and they can determine if de-vanning or opening the container is required. In one embodiment, multiple operators work in a matrix or networking environment and review the alarms generated automatically by the system. The operators then decide to clear or further investigate the alarms. The application of the system may be extended to supply chain security, where devices that are capable of sending messages through cell phones or satellite networks, may be attached to pallets and containers. These devices may be used to send alarms remotely to a central monitoring station, along with X-ray and video images if there is an alarm.

One of ordinary skill in the art would appreciate that although the process of an operator inspecting an image to verify that the cargo matches the manifest is much more efficient than manually opening the container, it still requires significant labor. The labor-intensive nature of the problem is even more evident in applications such as inspecting each railcar in a long train with hundreds of railcars and trying to identify thousands of cargo types. Often, it is difficult to identify the cargo from the numerous images in such cases.

To address this problem, in another embodiment, the present invention is directed towards the analysis of images generated by non-intrusive cargo inspection systems with the goal of improving the efficiency of the process to verify that cargo matches the manifest.

For the purpose of this specification, cargo manifest is defined as a manifest that lists all cargo codes carried on a specific shipment. Further, cargo codes may be standard, also known as harmonization codes, or may be provided by various local custom agencies and may be different depending on the jurisdiction.

In one embodiment, predetermined image features of inspected cargo with an associated cargo code are computed and compared with features associated with the same cargo code saved in a database. The comparison results in a probability that the inspected cargo matches the declared cargo in the manifest. If the probability is greater than a predetermined threshold, the cargo will be declared as matching the manifest. Otherwise, the cargo does not match the manifest. In another embodiment, the probability is presented to the operator and the operator makes the decision. These processes are illustrated by means of flowcharts in FIGS. 7, 8 and 9.

Figure 7:
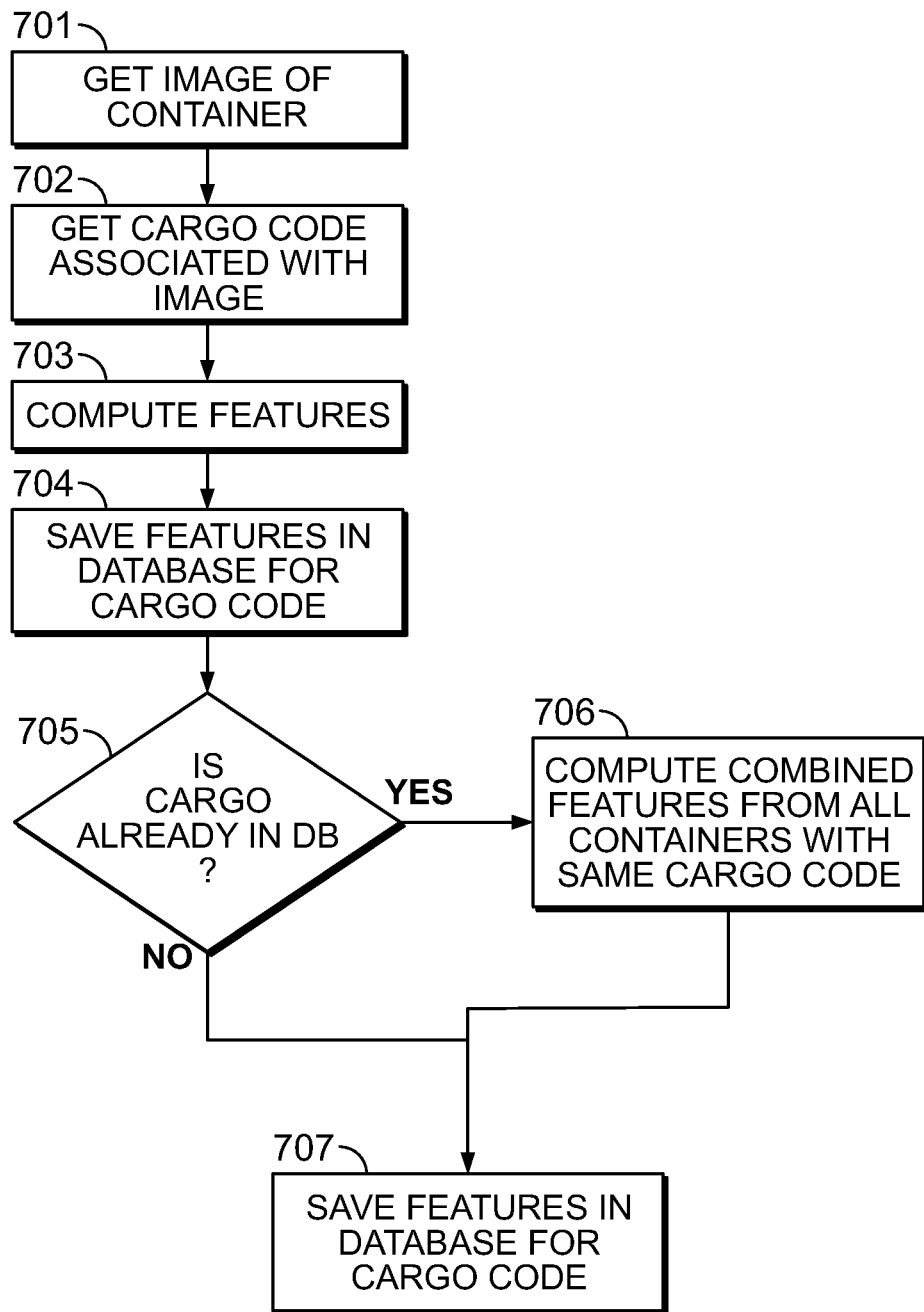
FIG. 7 is flowchart illustrating one process for preparing a features database, according to one embodiment of the system described in the present specification.

Referring to FIG. 7, the process of preparing a features database is shown. In the first step 701, the system obtains the image of the container. The image is obtained through non-intrusive scanning at any of the service posts, as described above. It should be understood by those of ordinary skill in the art that the radiographic images could be generated by low, medium or high-energy X-rays, gamma rays, neutrons or other type of radiation. The images could also contain atomic-number information generated from any modality of dual-energy or dual-species inspection. The images could be generated by one or more views and could be three dimensional reconstructed from the views.

After obtaining the image, the system obtains cargo code associated with the image, as shown in step 702. Cargo codes are obtained from manifest data, as described above. Thereafter, features of the image are computed, in step 703. Computed features and their standard deviation are then saved in the database along with the number of images used to compute the features, and are associated with that cargo code, as shown in step 704.

The features include, but not limited to, attenuation, texture, atomic number, and/or cargo height. For tomographic and multi-view systems, density is also a useful feature. This also would include elemental composition or features derived from the composition for neutron-based interrogation. It should be understood by those of ordinary skill in the art that other features not listed here could be used to match the cargos.

In the next step 705, the system checks if any entries for that cargo code are already stored in the database. If so, the system combines features from the containers with same cargo code. This is shown in step 706. The combination of the feature values takes into account the number of images used to compute the feature value and is weighted accordingly. Also, the user is notified of outlier feature values (values that are outside the three standard deviations or other selected range) for acceptance before the combination takes place. Thereafter the combined set of features for that particular cargo code is saved in the database, as shown in step 707. Thus, the features saved in the database per cargo code are computed from a combination of feature values from a large number of cargo images with same cargo code. The feature values are updated as additional cargo images are collected. Additional features can also be used computed as their usability becomes available.

Figure 8:
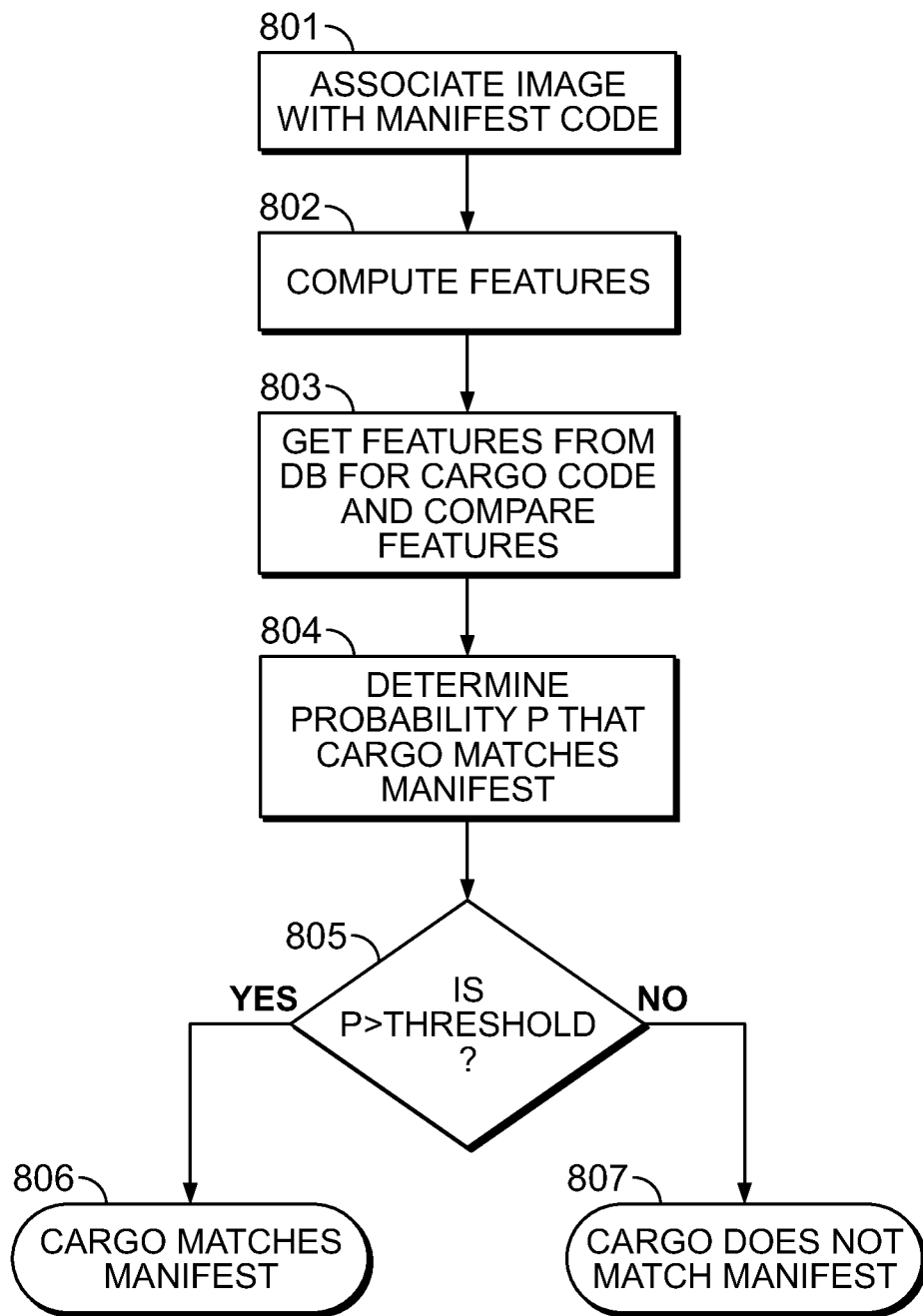
FIG. 8 illustrates the use of the features database described with respect to FIG. 7 to determine if cargo under inspection matches manifest information.

FIG. 8 illustrates a method for performing cargo-manifest verification for an individual cargo container. In the first step 801, an image captured at a service post is associated with one or more cargo codes, depending on the contents of the shipment as defined in manifest data. Then, the features of the image are computed, in step 802. Thereafter, the system obtains features for that cargo code stored in a database, and compares them to the computed features. This is shown in step 803. The system then determines the probability 'P' that cargo matches manifest, in step 804. Probability 'P' is then compared to a threshold value in step 805. If 'P' is greater than the threshold value, it implies that cargo matches manifest information declared, as shown in step 806. If 'P' is less than the threshold value, it indicates that the contents of the cargo are not the same as declared in the manifest, as shown in step 807.

In one embodiment, the threshold value may be determined in accordance with the user's preferences. For example, if custom office is using the system and they want to detect most contraband even at the expense of higher false alarm rate, they may be able to set a high threshold value, such as 90%. Conversely, if the custom agency does not want to have a high false alarm rate, they can choose to set a low threshold value, such as 60%. Further, the customer may decide that some categories of goods are more important, such as those associated with higher duties, than others and place different thresholds for different types of goods.

Further, before flagging cargo, a predetermined minimum set of images may be used to compute the features. The customer may decide that the features database is complete and more images do not need to be used. In this case, there is no need to add more images to the database. However, if the database did not use enough images, or the customer wants to improve the accuracy of detection, an authorized operator can request to add more images to the database. The operator should have a high confidence that the cargo matches the manifest, which is generally achieved with experience with the type of cargo coded in the manifest or a manual inspection and verification of the container contents.

Figure 9:
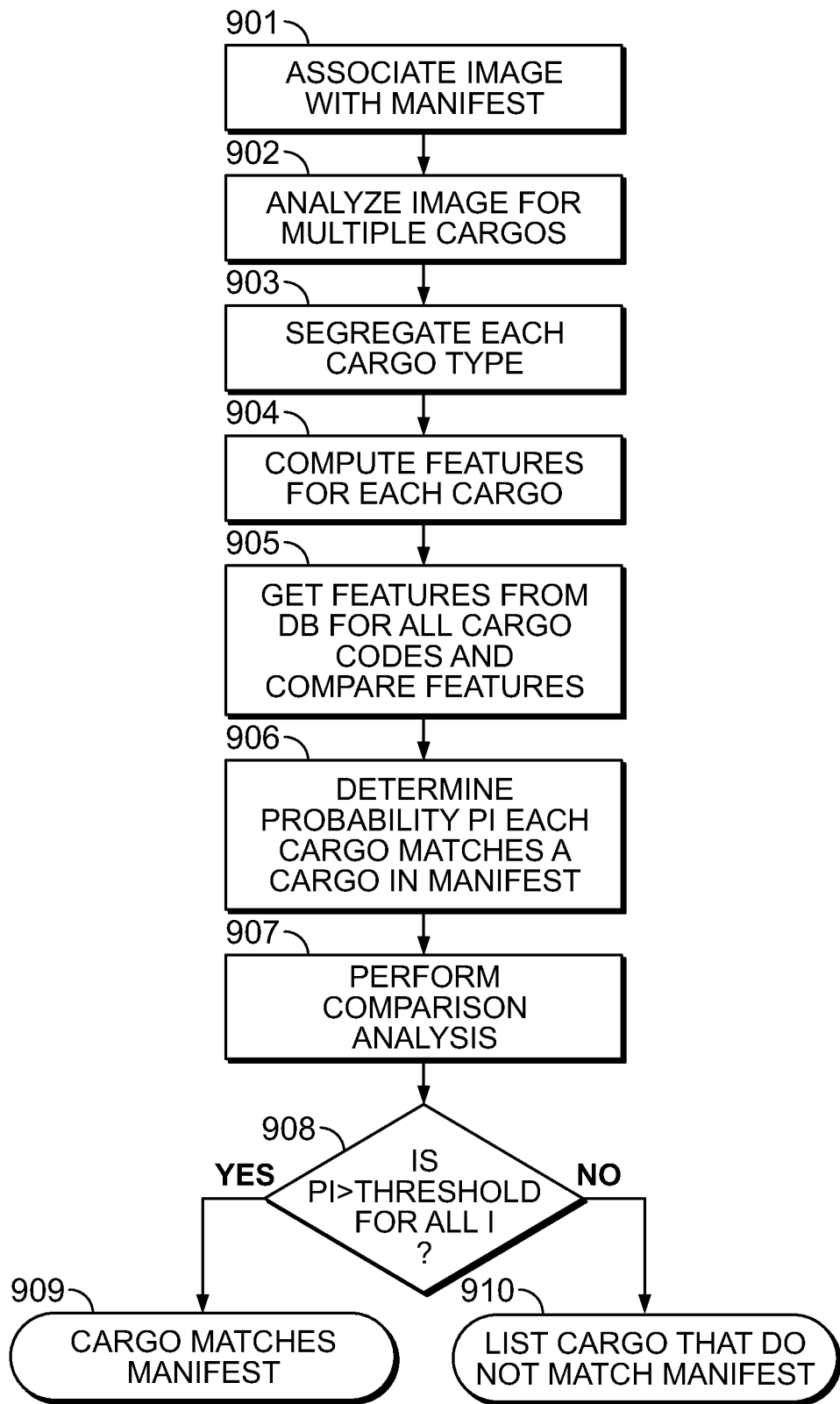
FIG. 9 illustrates the process of using the features database described with respect to FIG. 7 to determine if cargo under inspection matches the manifest, when there is more than one type of cargo present in the shipment.

When a shipment contains more than one type of cargo, the image is analyzed for different types of cargo and segregated. This process is illustrated in FIG. 9. Referring to FIG. 9, the system first associates the image of scanned cargo with manifest information in step 901. The image is the analyzed to determine if there are multiple cargos, in step 902. The system then segregates each cargo type, as shown is step 903. The segregation of cargo types is discussed in greater detail with respect to FIG. 11. The features for each cargo type are then computed in step 904 and compared in step 905 with the feature values stored in the database for each cargo type listed in the manifest. A list of probabilities for each segregated cargo is then produced. Thus, '$P_i$' is the probability that $i^{th}$ cargo matches with the declared manifest. This is shown in step 906.

Each '$P_i$' is then compared to the threshold value, as shown in step 907. One of ordinary skill in the art would appreciate that since there are more than one type of cargos, there may be more than one threshold value for comparison. The system checks if $P_i$ is more than the threshold value for all "i" in step 908. If $P_i$ is more that the threshold value for all "i", it is determined that the cargo matches the manifest, as shown in step 909. Otherwise, if one or more segregated cargos do not match features for one of the cargo codes in the manifest, the cargo(s) will be assigned as not matching the manifest and all cargos that do not match the manifest are listed. This is shown in step 910. Alternately, the probabilities for each segregated cargo may be displayed to the operator for decision.

Figure 11:
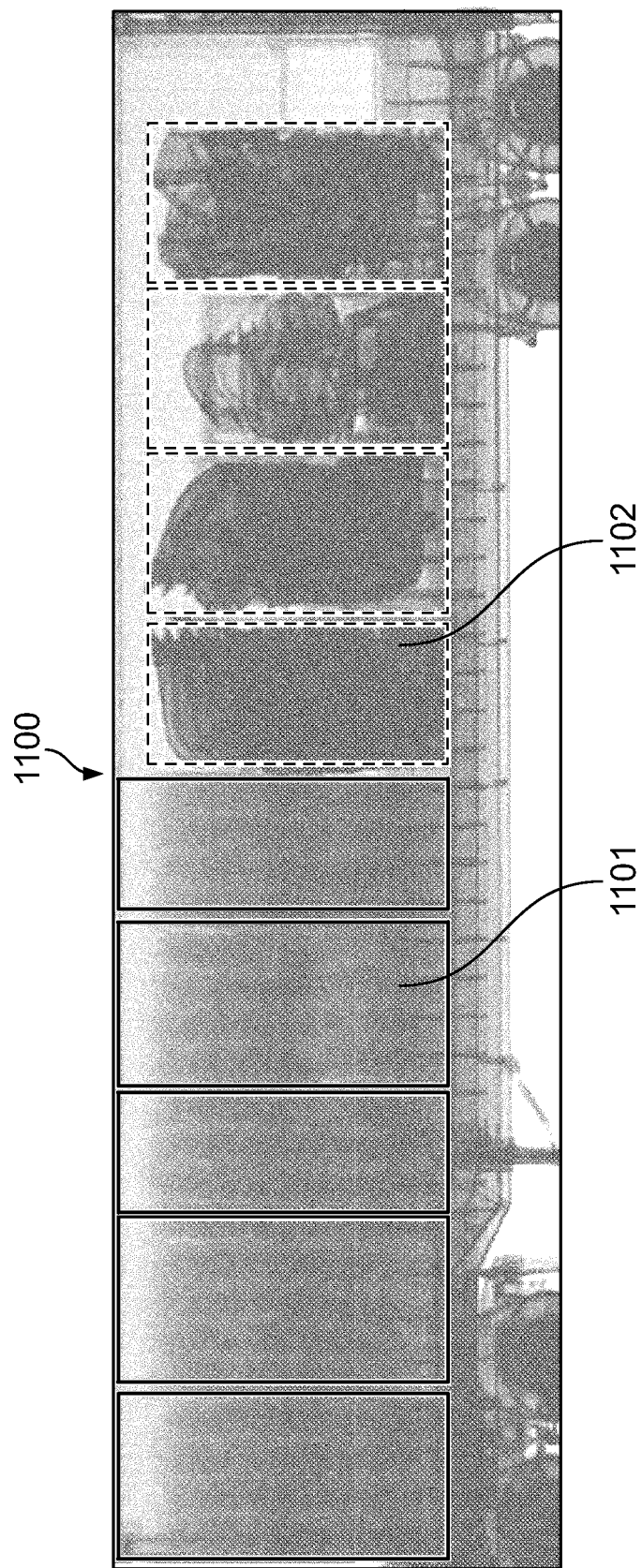
FIG. 11 illustrates the segregation of cargo into various cargo types based upon scanned images.

In one embodiment, an operator can separate the cargo visually and/or with the help of tools, such as a "rubber band" type of tool. In another embodiment, cargo may be automatically segmented and features of the different parts of the cargo may be computed, as shown in FIG. 11. Segmented regions with similar features are assumed to be same cargo. Thus, on the basis of features cargo in image 1100 of FIG. 11 may be segregated into Type 1 1101 and Type 2 1102.

In another embodiment, the operator inspects the image of a container with associated manifest. The operator then requests to retrieve from the image database a number of images of cargo with same cargo code. The operator compares the images visually and/or aided with various image manipulation tools to determine whether the cargo matches the manifest. If the manifest lists more than one cargo code, the operator would request images for each cargo code for comparison.

Figure 10:
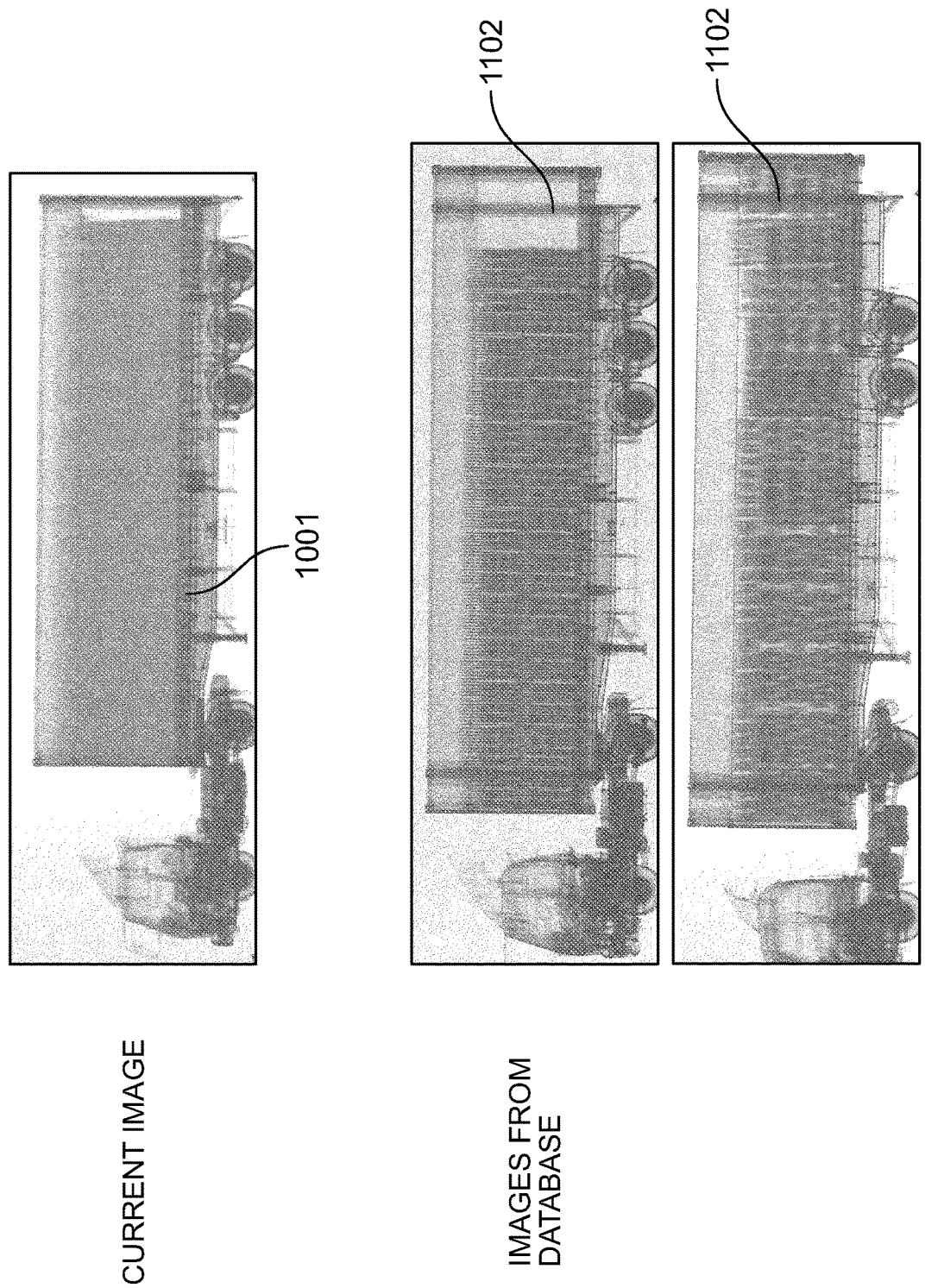
FIG. 10 illustrates how currently scanned images may be visually compared with images from the database of the present specification to determine if cargo matches the manifest.

Another method to assist the operator for determining whether a cargo image matches the manifest is to retrieve a number of images from the image database that have the same cargo type. This is shown in FIG. 10, wherein the current image 1001 of the cargo can be visually compared by the operator with images 1002 of the same cargo type from database. Additional assistance is provided by displaying values of various cargo features of the current and previously imaged cargo. In the example, shown, and by way of example only, the current image 1001 is different from the database images 1002. Thus, the operator should make a decision that the cargo does not match the manifest, because the current image is different from those in the database.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. A system for scanning an object, the system comprising:
   at least one non-intrusive X-ray inspection system configured to perform a non-intrusive X-ray scan and generate data representative of at least one X-ray scan image of the object;
   an application configured to import data representative of descriptive information about the object being scanned, wherein the descriptive information comprises manifest data corresponding to the object being scanned; and
   at least one computing device configured to:
      receive the data representative of the at least one X-ray scan image and the data representative of the descriptive information about the object being scanned;
      divide the data representative of the at least one X-ray scan image into regions, wherein each of the regions is defined by a plurality of values;
      apply a decision tree data structure to the plurality of values in each of the regions, wherein the decision tree data structure is configured to generate an output based on the plurality of values; and
      present the data representative of the at least one X-ray scan image to at least one operator via a display.

2. The system of claim 1, wherein the at least one computing device is further configured to determine a corresponding shape based on the output.

3. The system of claim 2, wherein the corresponding shape is representative of at least one of a gun or detonator.

4. The system of claim 2, wherein the output based on a plurality of values is at least one of a ratio of a surface area of the object to a value of a region or a measure of similarity between a shape of the region and a template shape stored in a memory of the system.

5. The system of claim 1, wherein the plurality of values in one region of the regions is representative of at least one of a measure of a variance of a pixel intensity within the one region or a measure of a skewedness of a distribution of pixel values within the one region.

6. The system of claim 1, wherein the at least one computing device is configured to divide the data representative of the X-ray scan images into regions by applying a statistical edge detection process and wherein the statistical edge detection process is adapted to acquire a pixel in at least one of the regions and determine if an adjacent pixel is part of the at least one of the regions.

7. The system of claim 6, wherein the statistical edge detection process is adapted to determine if an adjacent pixel is part of the at least one of the regions by comparing a value of the adjacent pixel to a function of the at least one of the regions.

8. The system of claim 1, wherein the at least one computing device is configured to determine a probability that the data representative of at least one X-ray scan image of the object are of a same type as specified in the data representative of the descriptive information about the object being scanned.

9. The system of claim 8, wherein the at least one computing device is further configured to compare the probability against a threshold value and, based on the comparison, generate an alarm.

10. The system of claim 1, further comprising an application configured to record a plurality of X-ray image inspection metrics.

11. The system of claim 10, wherein the plurality of X-ray image inspection metrics comprise data indicative of at least one tool the at least one operator used to analyze the data representative of the X-ray scan images.

12. The system of claim 11, wherein the at least one tool is one of a zoom function, contrast function, or brightness function.

13. The system of claim 10, wherein the X-ray image inspection metrics comprise a time stamp during which at least one operator inspected the data representative of the at least one X-ray scan image or a description of a portion of the data representative of the at least one X-ray scan image that was analyzed by the at least one operator.

14. The system of claim 10, wherein the application configured to record a plurality of X-ray image inspection metrics is further adapted to compare the metrics against a plurality of values to evaluate the at least one operator's performance.

15. The system of claim 1, wherein the at least one computing device is configured to present training images, together with the data representative of the at least one X-ray scan image, to the at least one operator via the display.

16. The system of claim 1, wherein the at least one computing device is configured to present the data representative of descriptive information about the object being scanned, together with the data representative of the at least one X-ray scan image, to the at least one operator via the display.

17. The system of claim 1, wherein the data representative of the at least one X-ray scan image is packaged together with metadata in a file, wherein the metadata comprises at least one of a time of the generation of at least one of the X-ray scan image, an identifier of the at least one operator, or data indicative of whether a rescan is required.

18. The system of claim 1, wherein the at least one computing device is located at a regional center remote from the at least one non-intrusive X-ray inspection system.

19. The system of claim 1, further comprising an application adapted to generate a user interface having a search function, wherein the search function is configured to allow the at least one operator to search for a cargo item by at least one of container number or arrival date range.

20. The system of claim 19, further comprising an application adapted to generate a set of search results based upon the search function, wherein the set of search results comprises at least one of a container type, shipper name, vessel name, expected arrival date, scan date, or scan results.

21. The system of claim 1, wherein the data representative of descriptive information about the object being scanned comprises at least one cargo code.

22. The system of claim 1, wherein at least one computing device is configured to determine if the data representative of the at least one X-ray scan image comprises multiple types of cargo.

23. The system of claim 1, wherein at least one computing device is adapted to configure the decision tree data structure to determine a contiguous volume and assign the volume to at least one predetermined shape corresponding to at least one of an oval bottle, a rectangular bottle, or a triangular bottle.

24. The system of claim 1, wherein at least one computing device is adapted to configure the decision tree data structure to correlate parameters corresponding to a volume shape and statistical properties.

25. The system of claim 1, wherein at least one computing device is adapted to configure the decision tree data structure to determine at least one of narcotics, currency, tobacco, liquid, nuclear materials, knives, or fire-arms.

26. The system of claim 1, wherein at least one computing device is adapted to configure the decision tree data structure to correlate parameters corresponding to one or more bow-tie shaped features, one or more rectangular shapes, and repeating patterns.

27. The system of claim 1, wherein at least one computing device is adapted to configure the decision tree data structure to correlate parameters corresponding to repeating array structures with a length and width dimension consistent with predefined dimensions of cigarettes and rectangular volumes of predefined aspect ratio matching that of cigarette packaging with a density that is consistent with cigarettes.

28. The system of claim 1, wherein at least one computing device is adapted to configure the decision tree data structure to correlate parameters corresponding to one or more protruding points, one or more blades having a predefined length to width aspect ratio, and folded blades having a repeating structure.

29. The system of claim 1, wherein at least one computing device is adapted to configure the decision tree data structure to correlate parameters corresponding to one or more cylindrical metal, one or more trigger mechanisms and firing pins and bullets with composition having a density ranging from 2.7 $g/cm^3$ to 11 $g/cm^3$.

30. The system of claim 1, wherein the plurality of values are generated by parameter extractors applied to one or more images and wherein the plurality of values comprise values indicative of a constant grey level or texture.

* * * * *